United States Patent
Shirakawa et al.

(10) Patent No.: US 9,072,969 B2
(45) Date of Patent: Jul. 7, 2015

(54) THREE-DIMENSIONAL PUZZLE GAME APPARATUS AND PROGRAM PRODUCT

(75) Inventors: Mari Shirakawa, Kyoto (JP); Yoshiki Suzuki, Kai (JP)

(73) Assignees: Nintendo Co., Ltd., Kyoto (JP); Hal Laboratory, Inc., Tokyo (JP)

( * ) Notice: Subject to any disclaimer, the term of this patent is extended or adjusted under 35 U.S.C. 154(b) by 1136 days.

(21) Appl. No.: 12/502,312

(22) Filed: Jul. 14, 2009

(65) Prior Publication Data

US 2010/0016049 A1    Jan. 21, 2010

(30) Foreign Application Priority Data

Jul. 16, 2008 (JP) ................................ 2008-184762

(51) Int. Cl.
| | |
|---|---|
| A63F 13/00 | (2014.01) |
| A63F 13/20 | (2014.01) |
| A63F 13/42 | (2014.01) |
| A63F 13/40 | (2014.01) |

(52) U.S. Cl.
CPC ......... *A63F 13/10* (2013.01); *A63F 2300/1075* (2013.01); *A63F 2300/305* (2013.01); *A63F 2300/6045* (2013.01); *A63F 2300/8094* (2013.01)

(58) Field of Classification Search
CPC ............ A63F 13/10; A63F 2300/1075; A63F 2300/8094; A63F 2300/6045; A63F 2300/305
USPC ............................... 463/30–33, 1–6, 46, 47, 9
See application file for complete search history.

(56) References Cited

FOREIGN PATENT DOCUMENTS

| | | |
|---|---|---|
| JP | 10-258182 | 9/1998 |
| JP | 2003-024631 | 1/2003 |
| JP | 2007-061372 | 3/2007 |

OTHER PUBLICATIONS

Cubes from Metaresearch, posted on Jul. 14, 2008, http://toucharcade.com/2008/07/14/cubes-from-manta-research/.*
Drymouth released Dec. 2000, as evidenced by review posted on Apr. 20, 2000. http://www.ign.com/articles/2000/04/21/drymouth.*
Japanese Office Action corresponding to Japanese Appln. No. 2008-184762 dated Jul. 16, 2013.
URL related to "Minesweeper" (with translation) http://dic.nicovideo.jp/a/%E3%83%9E%E3%82%A4%E3%83%B3%E3%82%B9%E3%82%A4%E3%83%BC%E3%83%91 printed on Aug. 7, 2013, pp. 1-4.

* cited by examiner

*Primary Examiner* — Ronald Laneau
*Assistant Examiner* — Ross Williams
(74) *Attorney, Agent, or Firm* — Nixon & Vanderhye, P.C.

(57) ABSTRACT

A three-dimensional puzzle game apparatus includes an LCD on which a three-dimensional puzzle is displayed. The three-dimensional puzzle includes a plurality of blocks arranged in each of three-dimensional directions in a virtual three-dimensional space. Furthermore, a hint numeral indicating the number of blocks to be left in a block row is displayed as information being a hint for searching a block to be left from the block row, for example. When a deleting instruction is performed on a block by utilizing a touch panel, for example, it is then determined that whether or not the block is a block to be left. When it is determined that the block is not a block to be left, the block is erased. When it is determined that all the remaining blocks are blocks to be left, it is determined that the three-dimensional puzzle is solved.

18 Claims, 21 Drawing Sheets

FIG. 3
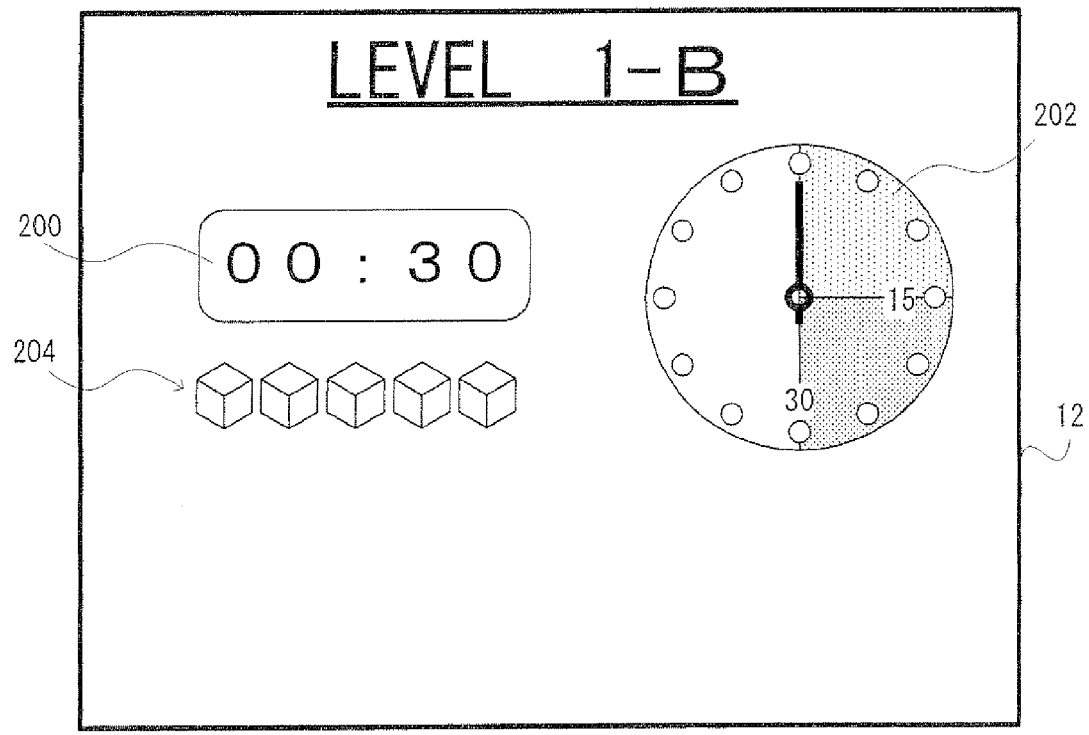
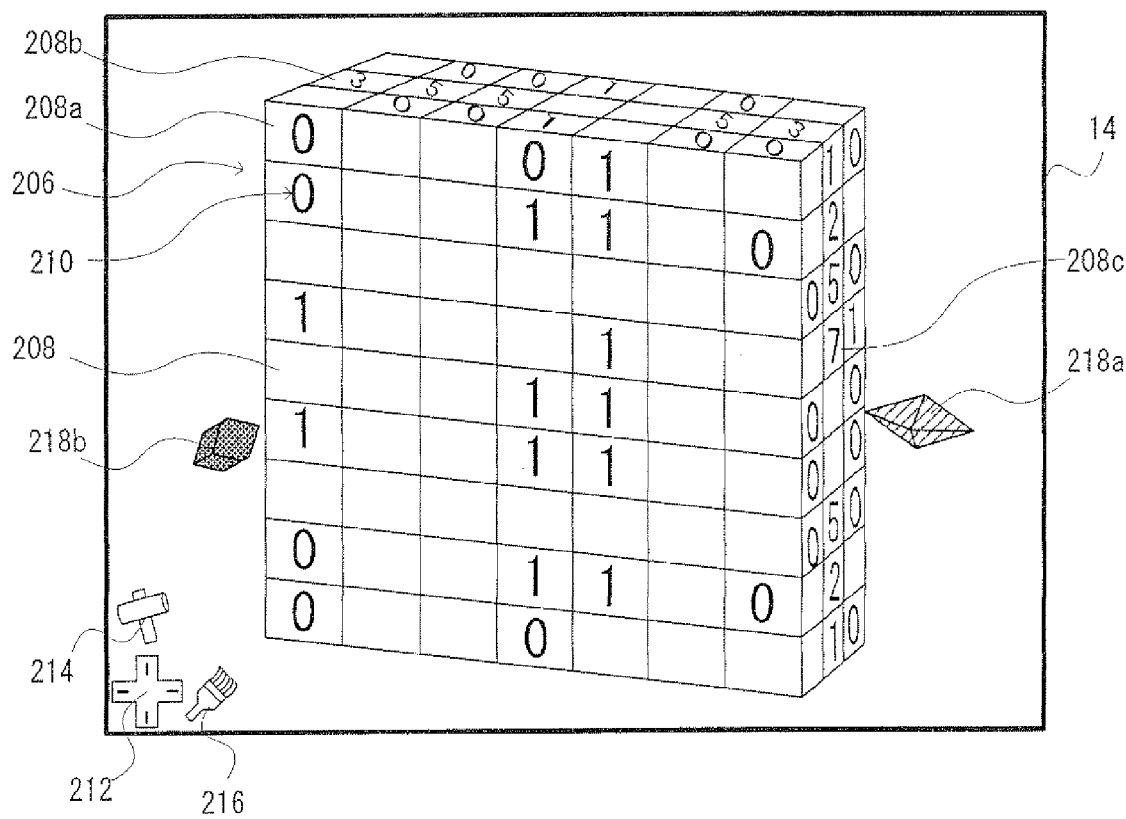

FIG. 14
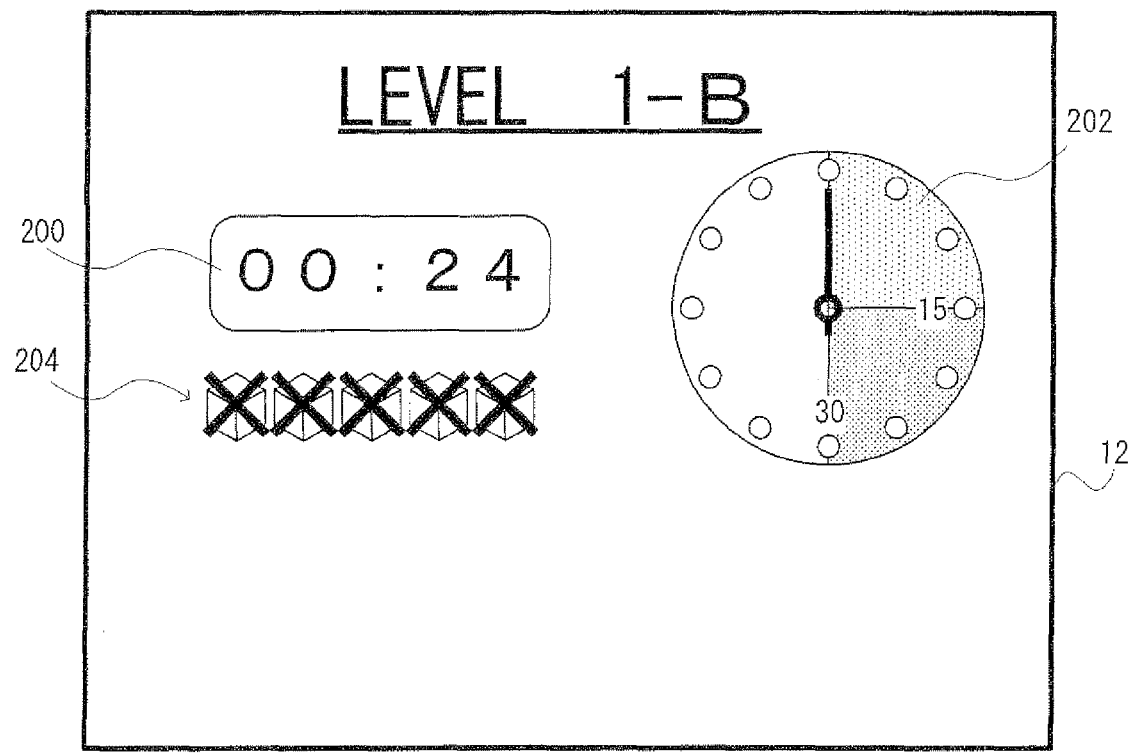
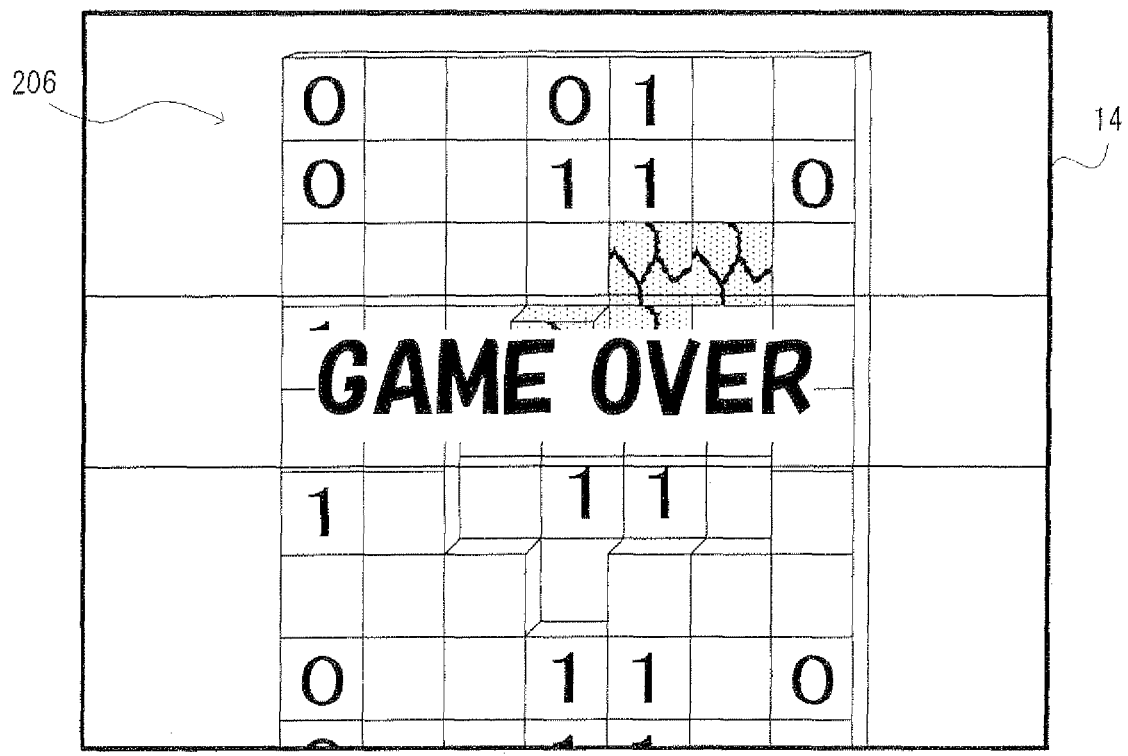

THREE-DIMENSIONAL PUZZLE GAME APPARATUS AND PROGRAM PRODUCT

CROSS REFERENCE OF RELATED APPLICATION

The disclosure of Japanese Patent Application No. 2008-184762 filed on Jul. 16, 2008 is incorporated herein by reference.

BACKGROUND OF THE INVENTION

1. Field of the Invention

The present invention relates a three-dimensional puzzle game apparatus and a program product. More specifically, the present invention relates to a three-dimensional puzzle game apparatus and a program product capable of executing a game of solving a three-dimensional puzzle in a virtual three-dimensional space.

2. Description of the Related Art

Conventionally, a puzzle game, so-called a drawing logic, is widely known in which a grid composed of a plurality of rows and columns is displayed on a two-dimensional field, and a cell of the grid is painted by taking hint information (numeral indicating the number of cells of the grid which can be painted) displayed in each row and each column as a clue, to thereby curve out an illustration, etc. The conventional drawing logic is a two-dimensional puzzle game in a matrix with rows and columns while a Patent Document 1 (Japanese Patent Application Laid-Open No. 2007-61372 [A63F 13/00]) is known as a game of applying this two-dimensional puzzle game into a three-dimensional puzzle game.

The Patent Document 1 discloses a puzzle game apparatus in which a three-dimensional illustration at the finish time is disassembled into a plurality of laminations (layers), a question and an answer are given for each layer, and if the user makes a correct answer for all the layers, a three-dimensional illustration is completed. More specifically, when a layer to be answered is selected by the user from a plurality of layers, a question relative to the selected layer is displayed. The user repetitively performs an operation of selecting and painting a cell of the grid according to a question for layer. When correct answers are entered in all the cells of all the layers, a three-dimensional illustration is displayed.

However, in the aforementioned Patent Document 1, displayed on the screen is the only selected one layer, and therefore, there is a problem that the user hardly grasps the shape of the three-dimensional puzzle when answering the question. Furthermore, the answering method is a method of inputting an answer to the layer on the two-dimensional layer, and this is the same as that of the conventional two-dimensional puzzle game, and therefore, there is a problem that the user hardly feels a sense of solving the three-dimensional puzzle.

SUMMARY OF THE INVENTION

Therefore, it is a primary object of the present invention to provide a novel three-dimensional puzzle game apparatus and a novel program product capable of deleting only an unnecessary block from a three-dimensional puzzle being composed of a plurality of blocks.

Another object of the present invention is to provide a three-dimensional puzzle game apparatus and a program product capable of enhancing interest of the puzzle game.

The present invention employs following features in order to solve the above-described problems. It should be noted that reference numerals and the supplements inside the parentheses show one example of a corresponding relationship with the embodiments described later for easy understanding of the present invention, and do not limit the present invention.

A first invention is a three-dimensional puzzle game apparatus executing a game for solving a three-dimensional puzzle in a virtual three-dimensional space, comprises: a displaying means for displaying a three-dimensional puzzle including a plurality of blocks arranged in each of three-dimensional directions of the virtual three-dimensional space and information as a hint for searching a block to be left from an arbitrary block row; an input determining means for determining whether or not a deleting instruction is performed on any one of the blocks on the basis of input information from an input means; a deletion determining means for, when the input determining means determines that the deleting instruction is performed on the block, determining whether or not the block to which the deleting instruction is performed is a block to be left; an erasing means for, when the deletion determining means determines that the block to which the deleting instruction is performed is not a block to be left, erasing the block on which the deleting instruction is performed; and a solution determining means for determining whether or not the three-dimensional puzzle is solved by determining whether or not all the remaining blocks are the block to be left.

In the first invention, a three-dimensional puzzle game apparatus (10) includes a displaying means (12, 14, 34, 44, 46, 50, S23), and the displaying means displays a three-dimensional puzzle (206) and hint information (210). A three-dimensional puzzle is formed by arranging a plurality of blocks (208) in a three-dimensional manner, and specifically, the three-dimensional puzzle includes a plurality of blocks arranged in each of the three-dimensional directions of the virtual three-dimensional space. For example, the three-dimensional puzzle may be a rectangular parallelepiped shape arranged in each direction (x, y, z axis direction) by a predetermined number (x, y, z pieces). Hint information indicates a hit for searching a block to be left among an arbitrary block row, and may be a hint numeral (210) indicating the number of blocks to be left in the block row, for example. In the three-dimensional puzzle game, the user designates a block to be deleted from the three-dimensional puzzle by utilizing an input means (22, 24). Thereupon, an input determining means (34, S7) determines whether or not a deleting instruction is performed on any one of the blocks on the basis of input information. When it is determined that the deleting instruction is performed, a deletion determining means (34, S53) determines whether or not the block to which the deleting instruction is performed is a block to be left. When it is determined that a block on which a deleting instruction is performed is not a block to be left, the block on which a deleting instruction is performed is erased by an erasing means (34, S55, S127). Thus, according to an instruction from the user, an unnecessary block is erased from the three-dimensional puzzle. A solution determining means (34, S25) determines whether or not the three-dimensional puzzle is solved by determining whether or not all the remaining blocks are the block to be left.

According to the first invention, it is possible to provide a novel puzzle game capable of being solved by deleting an unnecessary block by regarding the hint information as a clue which is displayed together with the three-dimensional puzzle constructed by arranging a plurality of blocks in each of the three-dimensional directions, which enhances interest of the puzzle game.

A second invention is a three-dimensional puzzle game apparatus according to the first invention, and further comprises a deletion information storing means for storing in advance deletion information indicating whether a deletion is correct or wrong by bringing it into correspondence with each of the plurality of blocks, wherein the deletion determining means performs a determination based on the deletion information corresponding to the block to which the deleting instruction is performed.

In the second invention, a deletion information storing means (28a, 314) stores in advance deletion information indicating whether a deletion is correct or wrong, and on the basis of the deletion information, a determination by the deletion determining means is performed. It is possible to determine whether or not a deleting instruction on a block is correct or wrong, with simple processing.

A third invention is a three-dimensional puzzle game apparatus according to the second invention, and further comprises a hint generating means for generating the hint information from the deletion information of the respective blocks making up of the block row.

In the third invention, on the basis of the deletion information of each block indicating whether a deletion is correct or wrong stored in advance, a hint generating means (34, S1) generates the hint information for searching a block to be left in each block row. Since the hint information can be generated from the deletion information, it is possible to save a memory capacity for storing the hint information in advance.

A fourth invention is a three-dimensional puzzle game apparatus according to the first invention, wherein the displaying means displays the hint information on a surface vertical to a direction of the row of the respective blocks making up of the block row.

In the fourth invention, since the displaying means displays the hint information for searching a block to be left in a block row on a surface of each block vertical to a direction of the block row, it is possible for the user to make easily viewable displaying the hint information.

A fifth invention is a three-dimensional puzzle game apparatus according to the first invention, wherein the input determining means further determines whether or not a marking instruction is performed on any one of the blocks on the basis of the input information, further comprises: a marking means for, when the input determining means determines that the marking instruction is performed on the block, storing information indicating that the block is marked by bringing it into correspondence with the block to which the marking instruction is performed; and an erasure inactivating means for, when the input determining means determines that the deleting instruction is performed, determining whether or not a block to which the deleting instruction is performed is a marked block, and inactivating the erasure processing on the marked block by the erasing means.

In the fifth invention, the input determining means (34, S9) determines whether or not a marking instruction is performed on any one of the blocks on the basis of the input information. When it is determined that the marking instruction is performed, information indicating that the block is marked by the marking means (34, S85) is stored by bringing it into correspondence with the block. When the input determining means determines that a deleting instruction is performed, an erasure inactivating means (34, S51) determines whether or not the block on which a deleting instruction is performed is a marked block, and inactivates the erasing processing on the marked block. The user can mark the block on which he or she wants to delete, and this makes it possible to prevent a block from being erroneously and accidentally deleted.

A sixth invention is a three-dimensional puzzle game apparatus according to the first invention, wherein the input determining means further determines whether or not a non-displaying instruction is performed on an arbitrary block on the basis of the input information, and the displaying means does not display the block on which the non-displaying instruction is performed when the input determining means determines that the non-displaying instruction is performed on the block.

In the sixth invention, the input determining means (34, S11, S13) further determines whether or not a non-displaying instruction is performed on an arbitrary block on the basis of the input information. When it is determined that a non-displaying instruction is performed on the block, the block on which a non-displaying instruction is performed is not displayed by the displaying means (34, S21, S125). For example, when a position from which undisplay is made is instructed in any one of the three-dimensional directions to which a plurality of blocks are arranged, blocks outside the designated position at the direction may be undisplayed. Since it is possible to undisplay an arbitrary block according to a user's instruction, the blocks, arranged inside, which cannot be viewed from outside can be displayed, capable of deleting (or marking) the inside block.

A seventh invention is a three-dimensional puzzle game apparatus according to the first invention, and wherein the input means includes a pointing device for designating an arbitrary position on a screen displayed by the displaying means, further comprises: a gaze calculating means for calculating a gaze from the designated position by the pointing device; and a specifying means for specifying the designated block by calculating an intersection point between the gaze and a surface of each block.

In the seventh invention, a pointing device (24) for designating an arbitrary position on the screen is provided as an input means. A gaze calculating means (34, S41, S43, S71, S73) calculates a gaze from the designated position by the pointing device. A block specifying means (34, S45-S49, S75-S79) specifies the designated block by calculating an intersection point between the gaze and the surface of each block. Thus, it is possible to specify a designated block out of a plurality of blocks making up of the three-dimensional puzzle with simple processing.

An eighth invention is a three-dimensional puzzle game apparatus according to the seventh invention, and further comprises a rotational amount calculating means for calculating an amount of rotation of the three-dimensional puzzle on the basis of an amount of change of the designated position by the pointing device, wherein the displaying means displays the three-dimensional puzzle rotated on the basis of the amount of rotation.

In the eighth invention, when the user moves the designated position with the pointing device, a rotational amount calculating means (34, S101-S105) calculates an amount of rotation of the three-dimensional puzzle on the basis of the amount of change (amount of movement of the designated position), and a displaying means (S121, S143) displays the three-dimensional puzzle rotated by the amount of rotation. Thus, it is possible to intuitively perform a rotating operation of the three-dimensional puzzle.

A ninth invention is a program product for a three-dimensional puzzle game apparatus executing a game for solving a three-dimensional puzzle in a virtual three-dimensional space, the program causes a computer of the three-dimensional puzzle game apparatus to execute: a displaying step for displaying a three-dimensional puzzle including a plurality of blocks arranged in each of three-dimensional directions of the virtual three-dimensional space and information as a hint for searching a block to be left from an arbitrary block row; an input determining step for determining whether or not a deleting instruction is performed on any one of the blocks on the basis of input information from an input means; a deletion determining step for, when the input determining step determines that the deleting instruction is performed on the block, determining whether or not the block to which the deleting instruction is performed is a block to be left; an erasing step for, when the deletion determining step determines that the block on which the deleting instruction is performed is not a block to be left, erasing the block on which the deleting instruction is performed; and a solution determining step for determining whether or not the three-dimensional puzzle is solved by determining whether or not all the remaining blocks are the block to be left.

The ninth invention is a program product including a game program applied to the three-dimensional puzzle game apparatus of the first invention, and has a similar advantage to the above-described first invention.

A tenth invention is a game controlling method of a three-dimensional puzzle game apparatus executing a game for solving a three-dimensional puzzle in a virtual three-dimensional space, and includes steps of a displaying step for displaying a three-dimensional puzzle including a plurality of blocks arranged in each of three-dimensional directions of the virtual three-dimensional space and information as a hint for searching a block to be left from an arbitrary block row; an input determining step for determining whether or not a deleting instruction is performed on any one of the blocks on the basis of input information from an input means; a deletion determining step for, when the input determining step determines that the deleting instruction is performed on the block, determining whether or not the block to which the deleting instruction is performed is a block to be left; an erasing step for, when the deletion determining step determines that the block to which the deleting instruction is performed is not a block to be left, erasing the block on which the deleting instruction is performed; and a solution determining step for determining whether or not the three-dimensional puzzle is solved by determining whether or not all the remaining blocks are the block to be left.

The tenth invention is a game controlling method applied to the three-dimensional puzzle game apparatus of the first invention, and has an advantage similar to the above-described first invention.

According to the present invention, the three-dimensional puzzle including the plurality of blocks, and the hint information for searching the block to be left is displayed in each block row, and the user can solve the puzzle by deleting unnecessary blocks therefrom. Thus, the user can solve the three-dimensional puzzle by utilizing the hint information as a clue as if the user curves out the three-dimensional puzzle. Thus, it is possible to provide a novel and interesting three-dimensional puzzle game capable of deleting only the unnecessary block from the three-dimensional puzzle being composed of the plurality of blocks.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 3 is an illustrative view showing one example of a screen at the beginning of the game.

FIG. 14 is an illustrative view showing one example of a screen when the game is over.

DETAILED DESCRIPTION OF THE PREFERRED EMBODIMENTS

Figure 1:
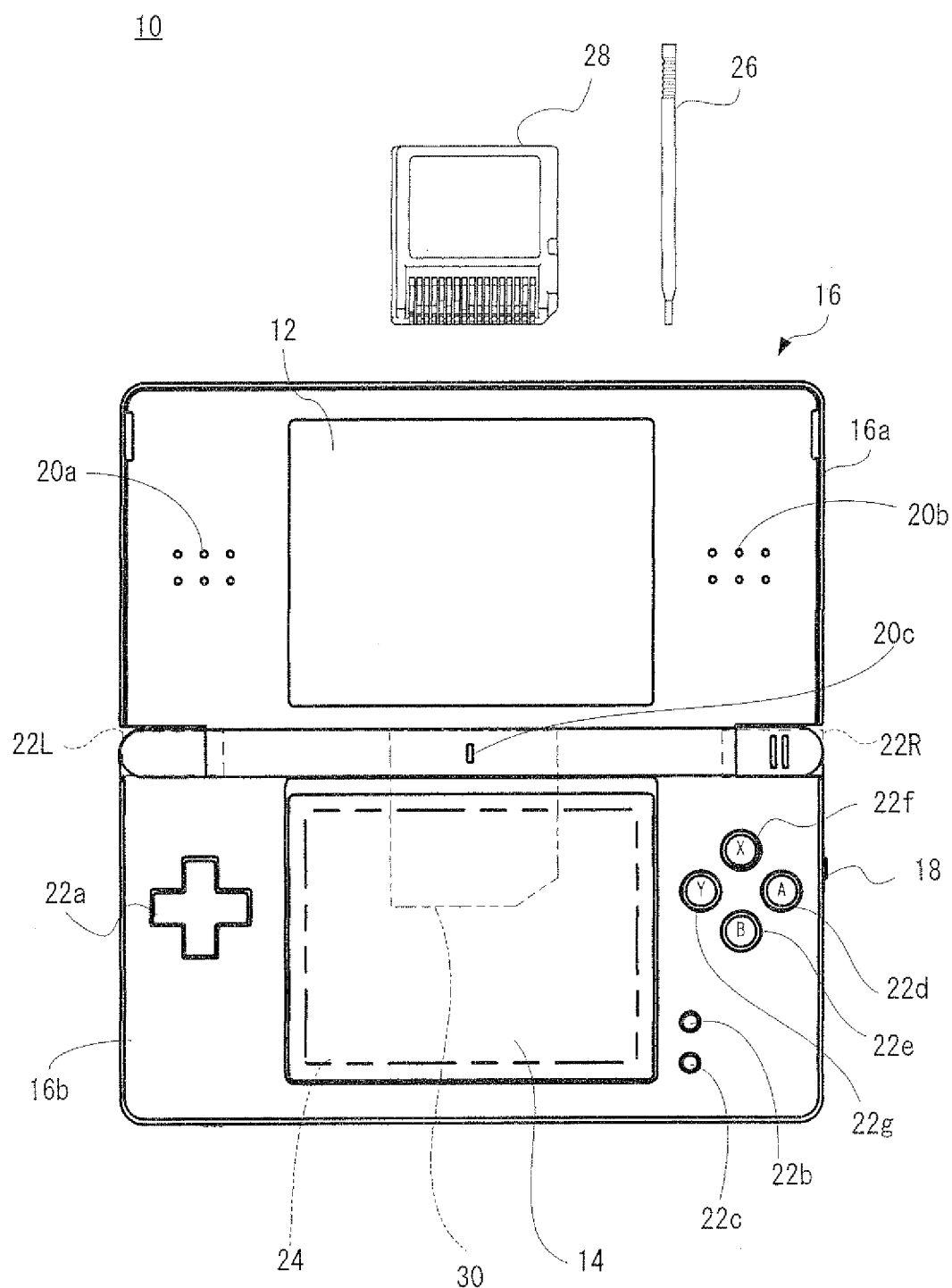
FIG. 1 is an illustrative view showing one embodiment of a game apparatus of this invention.

Referring to FIG. 1, a game apparatus 10 of this invention is implemented in the form of a hand-held typed game apparatus, as one example. However, the form of the game apparatus 10 is arbitrary, and may be a console typed game apparatus, a personal computer, a mobile information terminal, a cellular phone, etc.

The game apparatus 10 includes a first liquid crystal display (LCD) 12 and a second LCD 14. The LCD 12 and the LCD 14 are set on a housing 16 so as to be arranged in predetermined positions. In this embodiment, the housing 16 is composed of an upper housing 16a and a lower housing 16b, and the LCD 12 is provided on the upper housing 16a while the LCD 14 is provided on the lower housing 16b.

Accordingly, the LCD 12 and the LCD 14 are closely arranged so as to be longitudinally (vertically) parallel with each other.

In addition, although an LCD is utilized as a display in this embodiment, an EL (Electronic Luminescence) display, a plasmatic display, etc. may be used in place of the LCD.

As can be understood from FIG. 1, the upper housing 16a has a plane shape little larger than a plane shape of the LCD 12, and has an opening formed so as to expose a display surface of the LCD 12 from one main surface thereof. On the other hand, the lower housing 16b has a plane shape and a size approximately the same as those of the upper housing 16a, and has an opening formed so as to expose a display surface of the LCD 14 at an approximately center of the horizontal direction. Also, a power switch 18 is provided on the right side face of the lower housing 16b.

Furthermore, the upper housing 16a is provided with sound release holes 20a and 20b for speakers 36a and 36b (see FIG. 2) on both sides of the LCD 12.

The upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotatably folded such that the display surface of the LCD 12 and the display surface of the LCD 14 are face to face with each other, it is possible to prevent the display surface of the LCD 12 and the display surface of the LCD 14 from being damaged such as a flaw, etc. It should be noted that the upper housing 16a and the lower housing 16b are not necessarily rotatably connected with each other, and may alternatively be provided integrally (fixedly) to form the housing 16.

Then, a microphone hole 20c for a microphone (not illustrated) is formed at the center of the connected portion between the upper housing 16a and the lower housing 16b. This makes it possible to perform game processing on the basis of a sound signal by a sound, a voice or a breath taken from the microphone.

Furthermore, the lower housing 16b is provided with an operating switch 22 (22a, 22b, 22c, 22d, 22e, 22L and 22R).

The operating switch 22 includes a direction instructing switch (cross switch) 22a, a start switch 22b, a select switch 22c, an action switch (A button) 22d, an action switch (B button) 22e, an action switch (X button) 22f, an action switch (Y button) 22g, an action switch (L button) 22L, and an action switch (R button) 22R. The switch 22a is arranged at the left of the LCD 14 on one surface of the lower housing 16b. The other switches 22b-22g are arranged at the right of the LCD 14 on the one surface of the lower housing 16b. In addition, the operating switches 22L and 22R are arranged at the right and left corners on the upper side face of the lower housing 16b. It should be noted that action switches 22L and 22R are provided on a back surface of the lower housing 16b, and shown by dotted line because they are hidden under the connected portion in a front view as shown in FIG. 1.

The direction instructing switch 22a functions as a digital joystick, and is utilized for instructing a traveling direction (moving direction) of a player object (or player character) to be operated by a user or a player and instructing a traveling direction of a cursor, and so forth by operating any one of four depression portions. Also, a specific role can be assigned to each of the four depression portions, and by operating any one of the four depression portions, it is possible to instruct (designate) the assigned role.

The start switch 22b is formed by a push button, and is utilized for starting (restarting), temporarily stopping (pausing) a game, and so forth. The select switch 22c is formed by the push button, and utilized for a game mode selection, etc.

The action switch 22d, that is, the A button is formed by the push button, and allows the player object to perform an arbitrary action, except for instructing the direction, such as hitting (punching), throwing, holding (obtaining), riding, jumping, etc. For example, in an action game, it is possible to apply an instruction of jumping, punching, moving arms, etc. In a role-playing game (RPG) and a simulation RPG, it is possible to apply an instruction of obtaining an item, selecting and determining arms or command, etc. The action switch 22e, that is, the B button is formed by the push button, and is utilized for changing a game mode selected by the select switch 22c, canceling an action determined by the A button 22d, and so forth.

The action switch 22f, that is, the X button and the action switch 22g, that is, the Y button are formed by the push buttons, and are utilized for a subsidiary operation when the game cannot be advanced only with the A button 22d and the B button 22e. It should be noted that the X button 22f and the Y button 22g can be used for the similar operations to the A button 22d and B button 22e. Of course, the X button 22f and the Y button 22g are not necessarily utilized in the game play.

The action switch (left depression button) 22L and the action switch (right depression button) 22R are formed by the push buttons, and the left depression button (L button) 22L and the right depression button (R button) 22R can perform the same operation as the A button 22d and the B button 22e, and also function as a subsidiary of the A button 22d and the B button 22e. In addition, the L button 22L and the R button 22R can change the roles assigned to the direction switch 22a, the A button 22d, the B button 22e, the X button 22f and the Y button 22g to other roles.

Also, on a top surface of the LCD 14, a touch panel 24 is provided. As the touch panel 24, any kinds of a resistance film system, an optical system (infrared rays system) and an electrostatic capacitive coupling system, for example, can be utilized. The touch panel 24 is a pointing device for designating an arbitrary position within the screen of the LCD 14 by the user. In response to an operation (touch input) by depressing, stroking, touching, and so forth with a stick 26, a pen (stylus pen), or a finger (hereinafter, referred to as "stick 26, etc.") on a top surface of the touch panel 24, the touch panel 24 detects coordinates of an operated position by the stick 26, etc. to output coordinates data corresponding to the detected coordinates.

Additionally, in this embodiment, a resolution of the display surface of the LCD 14 (the same is true for the LCD 12) is 256 dots×192 dots. A detection accuracy of the touch panel 24 is also rendered 256 dots×192 dots in correspondence to the resolution of the display surface. However, the detection accuracy of the touch panel 24 may be lower than the resolution of the display surface, or higher than it.

Different game screens may be displayed on the LCD 12 and the LCD 14. For example, in a racing game, a screen viewed from a driving seat is displayed on the one LCD, and a screen of entire race (course) may be displayed on the other LCD. Furthermore, in the RPG, a map, characters such as, a player object, etc. are displayed on the one LCD, and items belonging to the player object may be displayed on the other LCD. Additionally, a game screen including a player object and a non-player object, etc. may be displayed on the one LCD, and a game screen including information relating to the player object and the non-player object or an operation screen for operating the player object can be displayed on the other LCD. Alternatively, by utilizing the two LCD 12 and LCD 14 as one screen, it is possible to display a large monster (enemy object) to be defeated by the player object.

Accordingly, the player is able to point (operate) an image, such as a player object, an enemy object, an item object, an operating object, etc. to be displayed on the screen of the LCD 14 and select (input) commands by operating the touch panel 24 with the use of the stick 26, etc. Also, it is possible to change the direction of a virtual camera (viewpoint) (direction of the line of sight) provided in the virtual game space (three-dimensional game space), and instruct a scrolling (gradual moving display) direction of the game screen (map).

Additionally, depending on the kind of the game, other input instructions can be made with the use of the touch panel 24. For example, it is possible to input by hand texts, numbers, symbols, etc. on the LCD 14 of the touch panel 24.

Thus, the game apparatus 10 has the LCD 12 and the LCD 14 as a display portion of two screens, and by providing the touch panel 24 on an upper surface of any one of them (LCD 14 in this embodiment), the game apparatus 10 has the two screens (12, 14) and the operating portions (22, 24) of two kinds.

Although the first LCD 12 and the second LCD 14 are vertically arranged, the arrangement of the two LCDs may be changed as necessary. In another embodiment, the first LCD 12 and the second LCD 14 may be horizontally arranged.

Furthermore, in this embodiment, two LCDs are provided, but the number of LCDs as a displaying means can be changed as necessary. In another embodiment, one vertically-long LCD is provided, and by vertically dividing the display areas into two, two game screens may be displayed on the respective display areas, or one horizontally-long LCD is provided, and by horizontally dividing the display area side by side, two game screens may be displayed on the respective display areas.

In addition, the stick 26 can be housed in the housing portion (not shown) provided on the lower housing 16b, for example, and taken out as necessary. It should be noted that if the stick 26 is not provided, the housing portion also need not to be provided.

Also, the game apparatus 10 includes a memory card (or cartridge) 28. The memory card 28 is detachable, and inserted into a loading slot 30 (shown by dotted lines in FIG. 1) provided on a back face of the lower housing 16b. Although omitted in FIG. 1, a connector 32 (see FIG. 2) is provided at a depth portion of the loading slot 30 for connecting a connector provided at an end portion of the memory card 28 in the loading direction, and when the memory card 28 is loaded into the loading slot 30, the connectors are connected with each other, and therefore, the memory card 28 is accessible by a CPU core 34 (see FIG. 2) of the game apparatus 10.

Furthermore although omitted in FIG. 1, a battery accommodating box is provided on a bottom face of the lower housing 16b, a volume switch, an earphone jack, etc. are provided on the front face of the lower housing 16b, and an external expansion connector is provided on the back face, for example.

Figure 2:
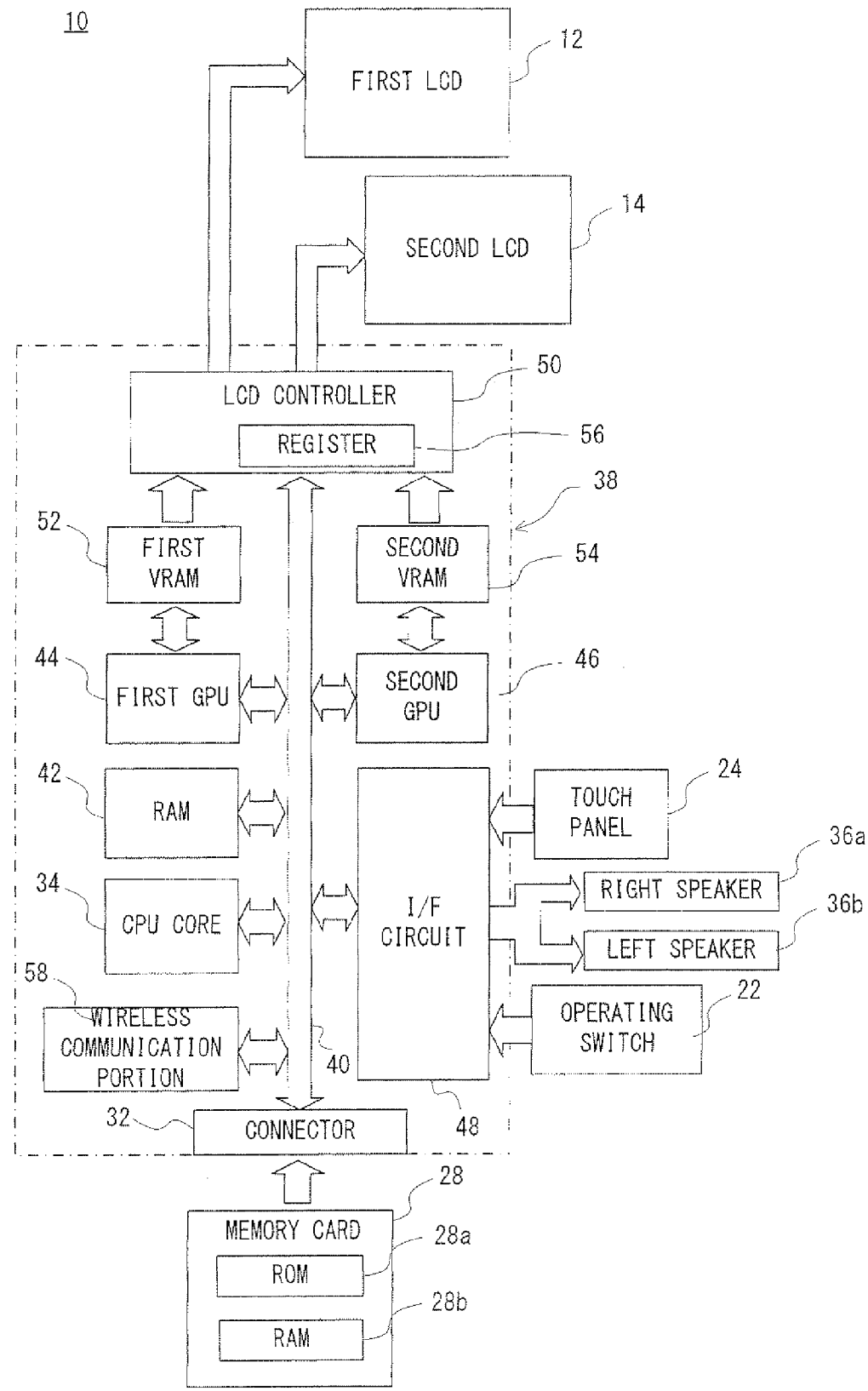
FIG. 2 is a block diagram showing one example of an electric configuration of the game apparatus shown in FIG. 1.

FIG. 2 is a block diagram showing an electrical configuration of the game apparatus 10. Referring to FIG. 2, the game apparatus 10 includes an electronic circuit board 38, and on the electronic circuit board 38, circuit components, such as the CPU core 34, etc. are mounted. The CPU core 34 is connected to the above-described connector 32 via a bus 40, and is connected with a RAM 42, a first graphics processing unit (GPU) 44, a second CPU 46, an input-output interface circuit (hereinafter, referred to as "I/F circuit") 48, an LCD controller 50, and a wireless communication portion 58.

The connector 32 is detachably connected with the memory card 28 as described above. The memory card 28 includes a ROM 28a and a RAM 28b, and although illustration is omitted, the ROM 28a and the RAM 28b are connected with each other via a bus, and also connected with a connector (not shown) to be connected with the connector 32. Accordingly, the CPU core 34 gains access to the ROM 28a and the RAM 28b as described above.

The ROM 28a stores in advance a game program for a game to be executed by the game apparatus 10, image data (text and object image, background image, item image, icon (button) image, message image, etc.), data of the sound (music) necessary for the game (sound data), etc. The RAM (backup RAM) 28b stores (saves) proceeding data of the game, result data of the game, etc. A flash memory, or the like may be executed as a memory for save.

The RAM 42 is utilized as a buffer memory or a working memory. That is, the CPU core 34 loads the game program, the image data, the sound data, etc. stored in the ROM 28a of the memory card 28 into the RAM 42, and executes the processing according to the loaded game program. The CPU core 34 executes a game process while storing data (game data, flag data, etc.) generated or obtained in correspondence with a progress of the game in the RAM 42.

It should be noted that the game program, the image data, the sound data, etc. are stored (loaded) from the ROM 28a entirely at a time, or partially and sequentially so as to be stored into the RAM 42.

Here, applications other than the game may be executed in the game apparatus 10, and in this case, in the ROM 28a of the memory card 28, necessary data, such as programs and image data relative to the application may be stored. Furthermore, sound (music) data may be stored as necessary.

Each of the GPU 44 and the GPU 46 forms a part of a rendering means, is constructed by, for example, a single chip ASIC, and receives a graphics command (rendering command) from the CPU core 34 to generate image data according to the graphics command. Additionally, the CPU core 34 applies an image generation program (included in the game program) required to generate the image data to both of the CPU 44 and CPU 46 in addition to the graphics command.

Furthermore, the GPU 44 is connected with a first video RAM (hereinafter referred to as "VRAM") 52, and the GPU 46 is connected with a second VRAM 54. The GPU 44 and the GPU 46 respectively access the first VRAM 52 and the second VRAM 54 to obtain data (image data: polygon data, texture data, etc.) required to execute the rendering command.

Here, the CPU core 34 writes image data necessary for rendering to the first VRAM 52 and the second VRAM 54 via the GPU 44 and the CPU 46. The GPU 44 accesses the VRAM 52 to produce image data for rendering, and stores the image data in a rendering buffer of the VRAM 52. The GPU 46 accesses the VRAM 54 to produce image data for rendering, and stores the image data in a rendering buffer of the VRAM 54. As a rendering buffer, a frame buffer, a line buffer, or the like may be adopted.

The VRAM 52 and the VRAM 54 are connected to the LCD controller 50. The LCD controller 50 includes a register 56, and the register 56 consists of, for example, one bit, and stores a value of "0" or "1" (data value) according to an instruction from the CPU core 34. The LCD controller 50 outputs the image data produced by the GPU 44 to the LCD 12, and outputs the image data produced by the GPU 46 to the LCD 14 in a case that the data value of the register 56 is "0". Additionally, the LCD controller 50 outputs the image data produced by the GPU 44 to the LCD 14, and outputs the image data produced by the GPU 46 to the LCD 12 in a case that the data value of the register 56 is "1".

Here, the LCD controller 50 can directly read the image data from the VRAM 52 and the VRAM 54, or read the image data from the VRAM 52 and the VRAM 54 via the GPU 44 and the GPU 46, respectively.

Furthermore, the VRAM 52 and the VRAM 54 may be provided to the RAM 42, or the rendering buffer and the Z buffer may be provided to the RAM 42.

The I/F circuit 48 is connected with the operating switch 22, the touch panel 24 and the speakers 36*a*, 36*b*. Here, the operating switch 22 is the above-described switches 22*a*, 22*b*, 22*c*, 22*d*, 22*e*, 22*f*, 22*g*, 22L and 22R, and in response to an operation of the operating switch 22, a corresponding operation signal (operation data) is input to the CPU core 34 via the I/F circuit 48. Furthermore, coordinates data output from the touch panel 24 is input to the CPU core 34 via the I/F circuit 48. In addition, the CPU core 34 reads from the RAM 42 the sound data necessary for the game, such as a game music (BGM), a sound effect or voices of a game character (onomatopoeic sound), etc., and outputs the same from the speakers 36*a*, 36*b* via the I/F circuit 48.

The wireless communication portion 58 is a communication means for transmitting and receiving data with another game apparatus 10 or communications equipment according to a wireless manner. Here, the weak radio wave transmitted and received by the game apparatus 10 is set in intensity to such a degree as not to be restricted by the Radio Law. When the CPU core 34 applies game data, data such as a command, etc. to the wireless communication portion 58, the wireless communication portion 58 modulates communication data to be transmitted to the opponent into a wireless signal and transmits it from an antenna. Furthermore, the wireless communication portion 58 receives a wireless signal from the opponent by the antenna to demodulate it to data, and applies the data to the CPU core 34. Via the wireless communication portion 58, the game apparatus 10 receives and transmits data with another game apparatus 10 to thereby execute a communication game. The game apparatus 10 can connect to a network via the wireless communication portion 58, and thus can download a program and data from a server on the network, uploads the data to the server, communicate with another game apparatus 10 via the network.

In this embodiment, a game of solving a three-dimensional puzzle in a virtual three-dimensional space, that is, a three-dimensional puzzle game is executed. The three-dimensional puzzle includes a plurality of blocks which are arranged by a predetermined number in each of the three-dimensional directions in the virtual three-dimensional space. That is, a three-dimensional puzzle is formed by arranging the plurality of blocks in a row in each of three-dimensional directions. Together with the three-dimensional puzzle, and information as a hint for searching a block to be left from an arbitrary block row is displayed. In a case that a block for which a deleting instruction is made by the user (player) is an unnecessary block, the block is erased. By deleting all the unnecessary blocks from the three-dimensional puzzle, a predetermined three-dimensional model is completed, so that it is determined that the three-dimensional puzzle is solved.

FIG. 3 shows one example of a game screen to be displayed at the beginning of the game. The upper screen is a screen of the LCD 12, and the lower screen is a screen of the LCD 14 of the touch panel 24.

On the upper screen, a level of the question (three-dimensional puzzle) and a condition for being game over are displayed. In this embodiment, a time limit and a mistake allowable number are set as a condition for game over. The time limit is represented by a clock 200 on the left, and the time of the clock 200 is counted down (or counted up) with the course of time. Here, a clock 202 on the right is for representing an elapsed time from the start of the game. Furthermore, a mistake allowable number is for restricting the number of so-called touches of wrong cards, that is, the number of deleting instructions erroneously performed on a block to be left. The mistake allowable number is represented by the number of blocks 204, and every mistake, the image of the block 204 is changed to an image representing a mistake. In FIG. 3, the time limit is 30 minutes, and the mistake allowable number is five. In a case that all the unnecessary blocks cannot be deleted within the time limit, or in a case that the number of erroneous instruction of the block to be deleted reaches the mistake allowable number, the game is to be over.

On the lower screen, when the game is started, a text of "game start" is displayed, and a three-dimensional puzzle 206 as a question is displayed at the center. The three-dimensional puzzle 206 includes a plurality of blocks 208. The plurality of blocks 208 are placed in a three-dimensional manner in the virtual three-dimensional space, to thereby form the three-dimensional puzzle 206 in a predetermined shape. In the three-dimensional puzzle 206, a three-dimensional shape or model is hidden as an answer. That is, the three-dimensional puzzle 206 has an enough size and shape to contain the model as an answer.

In this embodiment, each block 208 is formed in a cube with a predetermined size. The plurality of blocks 208 are arranged in three directions which are orthogonal to one another, that is, in vertical, horizontal and height directions (or, vertical, horizontal, and depth directions) of the block 208 by a predetermined number, to thereby form the three-dimensional puzzle 206 in a rectangular parallelepiped shape. For this three-dimensional puzzle 206, an orthogonal coordinates system is defined, regarding the vertical, horizontal, and depth directions of the block 208 as three-axis directions. The orthogonal coordinate system is called a block coordinate system. By utilizing the block coordinate system for representation, x, y, z blocks 208 are arranged in x axis, y axis and z axis directions of the block coordinate system, to thereby form the three-dimensional puzzle 206. The number of blocks 208 in each axis direction, that is, x, y, z may be numbers different from one another. In the block coordinate system, the arrangement position of the block 208 and a coordinate value are set to be brought into correspondence. For example, in a case that the block 208 is at the origin, the coordinates is (0, 0, 0), and in a case that the block 208 is adjacent to the origin in the x axis direction, the coordinates is (1, 0, 0).

Here, a maximum size of the three-dimensional puzzle 206 is decided in advance, and the block data at a time of the maximum size is configured to be stored in a memory. For example, the maximum size is set to 10*10*10, and the arrangement position of 1000 block data and the coordinates of the blocks 208 are configured to be one-to-one correspondence with each other. That is, the block data are arranged in 10*10*10 array, and the index number (element number) of the array directly corresponds to the coordinates of the block coordinate system.

On the lower screen, hint information representing information (numeral) being a hint for searching the block to be left 208 is displayed together with such three-dimensional puzzle 206. In this embodiment, on a surface of each block 208, the hint information is displayed. More specifically, on a surface vertical to the row direction of respective blocks 208 making up of the block row, a hint numeral 210 indicating the number of blocks to be left 208 in the block row is displayed. That is, as to each block 208, on the surface arranged in the direction of the block row (surfaces opposite to each other in the direction of the block row), the number of blocks to be left 208 out of the block row is displayed. For example, note a block 208a arranged at the upper left of the front face of the three-dimensional puzzle 206 shown in FIG. 3. On the front face of the block 208a, hint information of a numeral "0", is displayed. This means that with respect to the block row composed of the three blocks 208 arranged in the direction of thickness (depth) of the block 208a, there is no block to be left. Furthermore, note a block 208b arranged at the center of the leftmost row on the top face of the three-dimensional puzzle 206. On the top face of this block 208b, hint information of a numeral "3", is displayed. This means that with respect to the block row composed of the nine blocks 208 arranged in the direction of height (vertical direction) direction of the block 208b, there are three blocks to be left. Additionally, note a block 208c arranged at the forth line from the top and the second row from the viewer on the right side face of the three-dimensional puzzle 206. On the right side face of the block 208c, hint information of a numeral "7" is displayed. This means that with respect to the block row composed of the seven blocks 208 arranged in the direction of the width (horizontal direction) of the block 208c, there are seven blocks to be left. Whether the hint numeral 210 on each face is to be shown or not (displayed or not) is decided in advance by a creator of the questions or a manufacturer. There is no need of displaying the hint numeral 210 on all the six faces of the cubic block 208. Thus, displaying the hint information on the surface of the block 208 makes it possible for the player to easily view the hint information.

The user decides a block to be deleted 208 and a block to be left 208 taking the hint numeral 210 displayed on each block 208 as a clue. For example, in a case that "0" as a hint numeral 210 is displayed, this means that there is no block to be left 208 in the block row, so that all the blocks 208 in the block row can be deleted. Furthermore, in a case that a numerical value the same as the number of blocks 208 existing in the block row is displayed as a hint numeral 210, all the blocks 208 in the block row are to be the block to be left 208.

With respect to the block 208 to be deleted, the user performs an operation of instructing deletion of the block 208, to thereby erase an unnecessary block 208. With respect to a block to be left 208, the user performs an operation of instructing marking the block 208, to thereby mark a necessary block 208. Marking eliminates the need of remembering that it is decided that this is not a block 208 to be deleted as to each block 208.

In this embodiment, as a deletion instructing operation, an operation of pressing an upward direction of the direction instructing switch 22a and touching the block 208 is set. Furthermore, as a marking instructing operation, an operation of pressing a right direction of the direction instructing switch 22a and touching the block 208 is set. At the lower left corner of the lower screen, an image for guiding the user to perform a deletion instructing operation and a marking instructing operation of the block 208 is displayed. More specifically, a direction instructing switch 212 is displayed, and a hammer 214 is displayed. In addition, a hammer 214 is displayed by being brought into correspondence with the upper direction of the direction instructing switch 212, suggesting a tool for destroying the block 208, and a brush 216 is displayed by being brought into correspondence with the right direction, suggesting a tool for coloring the block 208. Here, the aforementioned operation of the direction instructing switch 22a is for a right-handed user (user holding the stick 26 with the right hand). For a left-handed user (user holding the stick 26 with the left hand), in a case of a deletion instructing operation, the X button 22f may be used in place of the upper direction of the direction instructing switch 22a, and in a case of a marking instructing operation, the A button 22d may be used in place of the right direction of the direction instructing switch 22a.

Here, the above-described deletion instructing operation and marking operation are one example, and they thus may be changed as necessary. For example, both of the deleting instruction and the marking instruction are used by first selecting the kind of the operation between deletion and marking, and then touching the block 208 on the touch panel 24.

In addition, on the lower screen, slicers 218a and 218b are displayed at predetermined positions around the three-dimensional puzzle 206. Here, the slicers 218a and 218b may be inclusively denoted by a reference numeral "218".

The slicer 218 is an object used for an operation of displaying the inside of the three-dimensional puzzle 206. The three-dimensional puzzle 206 is constructed such that the plurality of blocks 208 are arranged in a three-dimensional manner as understood from FIG. 3, so that some blocks 208 which cannot be seen from outside (camera), that is, inner blocks 208 exist. With respect to the inside blocks 208, some blocks 208 can be determined whether or not to be deleted from the hint numeral 210 displayed on the outside block 208, that is, the block 208 which can be seen from the outside (camera). In this embodiment, according to an operation with the slicer 218, the outside blocks 208 of the three-dimensional puzzle 206 are configured to be temporarily undisplayed, and the inside blocks 208 are configured to be displayed. The detail of the operation method and the function of the slicer 218 are described later.

Figure 4:
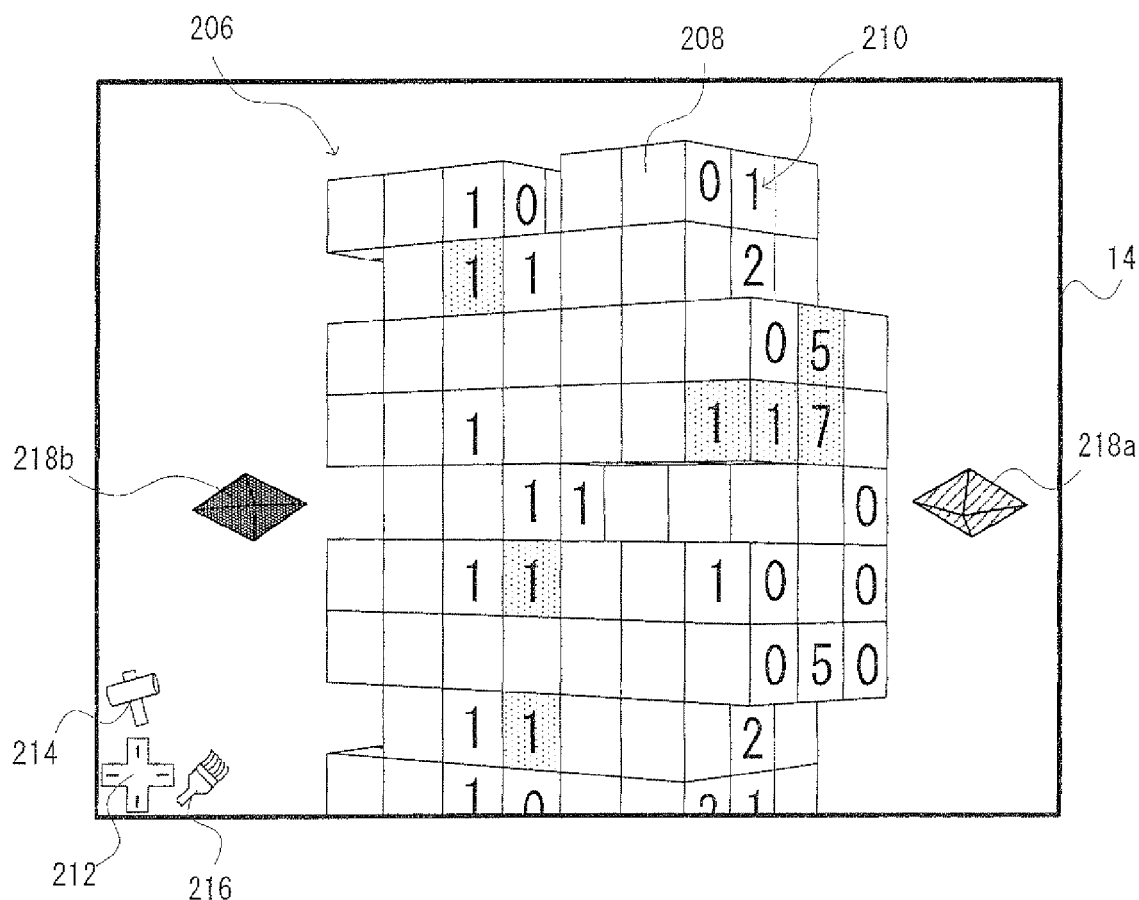
FIG. 4 is an illustrative view showing one example of a screen including deleted blocks and marked blocks.

FIG. 4 is an illustrative view showing deletion and marking of the block 208. In deleting, the user performs a deletion instructing operation as described above on the block 208 which is determined to be the block 208 to be deleted from the hint numeral 210. If the block 208 is not the block to be left 208, the block 208 is erased from the three-dimensional puzzle 206.

On the other hand, in marking, the user performs a marking instructing operation as described above on the block 208 which is determined to be the block to be left 208 from the hint numeral 210. This changes the color of the block 208 to a color different from an original predetermined color.

Figure 5:
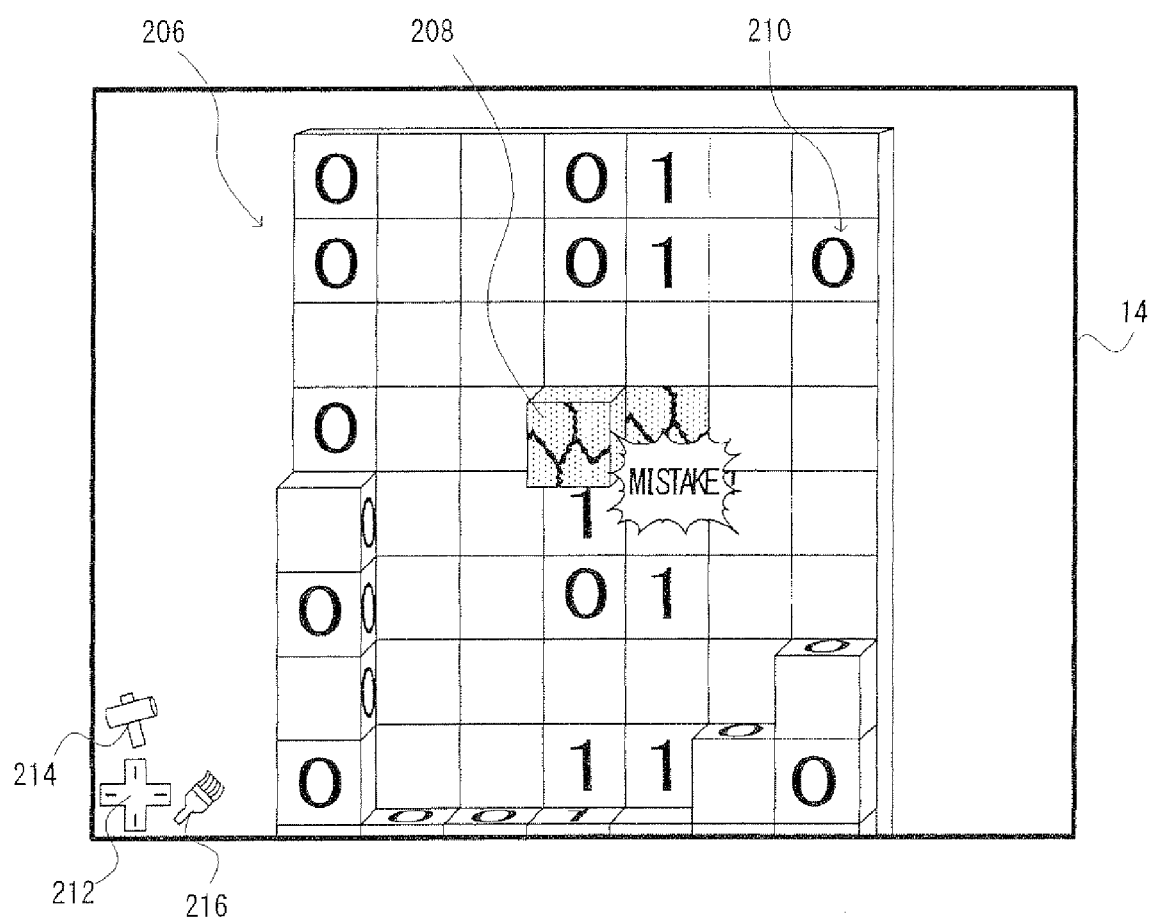
FIG. 5 is an illustrative view showing one example of a screen including a block for which a mistake in deleting instruction occurs.

Furthermore, in a case that a block 208 on which a deleting instruction is performed is the block to be left 208, the block 208 is displayed by using an image indicating a mistake without being erased as shown in FIG. 5. For example, the block 208 is changed to the cracked block 208 together with a text of "mistake". Noted that this text of "mistake" clearly shows that the block 208 is the block to be left 208, and therefore, in this embodiment, the color of the block 208 is changed to the color the same as that in marking.

Figure 6:
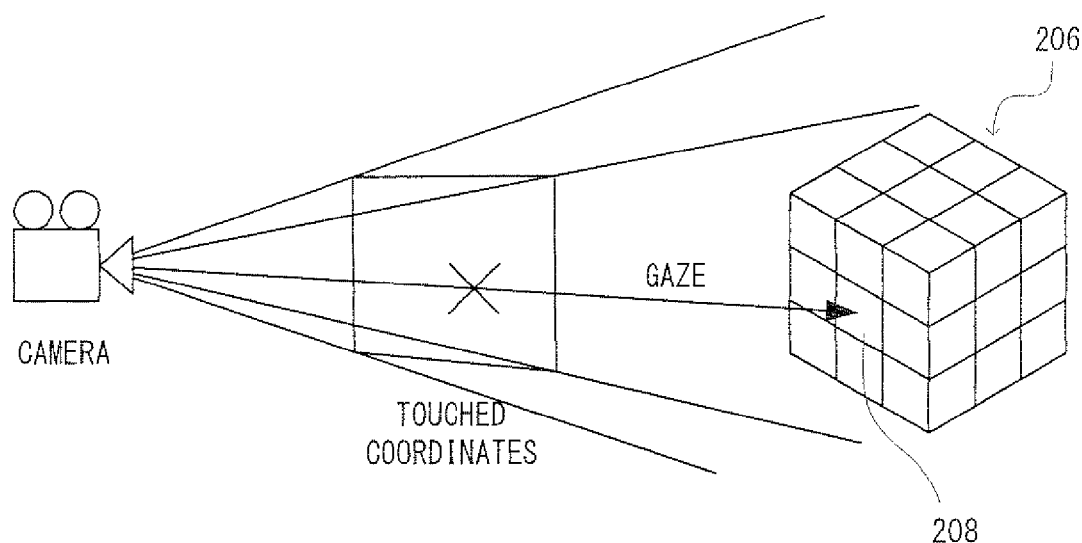
FIG. 6 is an illustrative view for showing a relationship among a camera, a touched coordinates and a three-dimensional puzzle, and a gaze.

Succeedingly, referring to FIG. 6 to FIG. 9, a method of specifying the block 208 designated by the user is explained. FIG. 6 is an illustrative view showing a relationship among a camera, touched coordinates and blocks 208, and a gaze. The three-dimensional puzzle 206 is drawn by a perspective projection transformation on a virtual screen. The virtual screen corresponds to the touch panel 24 in the virtual three-dimensional space. Accordingly, the designated block 208 is specified by utilizing a line connecting the camera (viewpoint) and the touched coordinates. This line is here called a gaze since it extends from the camera.

In this embodiment, an orthogonal coordinate system is defined, taking vertical, horizontal and depth directions of the virtual three-dimensional space as three-axis directions. This orthogonal coordinate system is called a world coordinate system. By utilizing the world coordinate system, the arrangement positions and the coordinate values of the camera, the three-dimensional puzzle 206, the block 208, and the slicer 218 in the virtual three-dimensional space are set. The world coordinate system is merely different from the aforementioned block coordinate system in the origin and the axes, and they can be transformed with each other.

More specifically, as shown in FIG. 6, two-dimensional touched coordinates are first transformed into the world coordinate system of the virtual three-dimensional space in which the camera and the three-dimensional puzzle 206 are arranged. Next, a line from the position of the camera to the touched coordinates which has been transformed into the three-dimensional coordinates, that is, a gaze is drawn. The gaze is transformed into the block coordinate system for the three-dimensional puzzle 206. Then, it is determined which block 208 of the three-dimensional puzzle 206 the gaze turns to.

Figure 7:
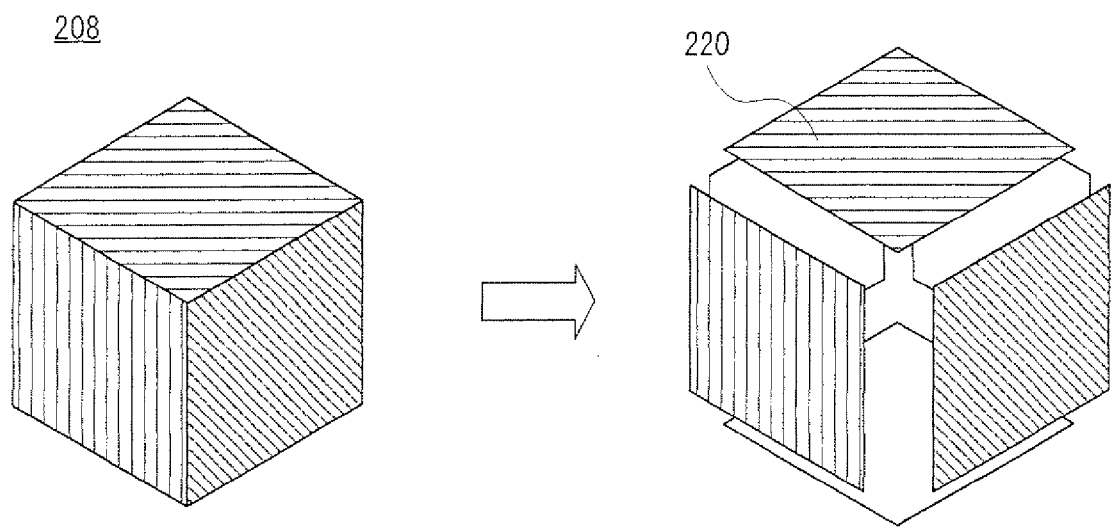
FIG. 7 is an illustrative view explaining an idea of regarding a block as a set of surfaces.
Figure 8:
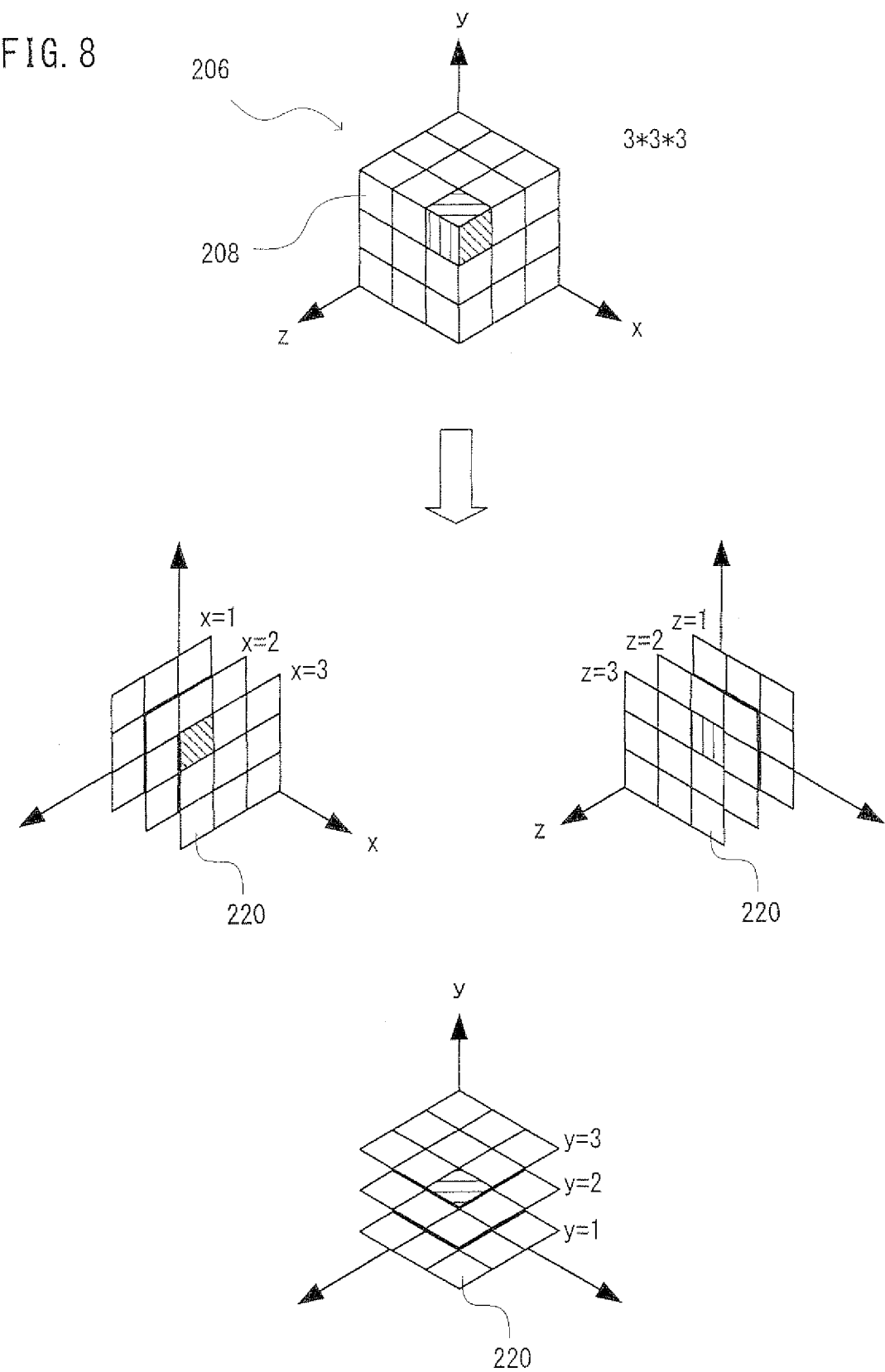
FIG. 8 is an illustrative view explaining an idea of regarding a three-dimensional puzzle being composed of blocks of 3*3*3 as a set of planes.

In calculation of specifying the designated block 208, the ideas shown in FIG. 7 and FIG. 8 are utilized. As shown in FIG. 7, the block 208 is a set of six faces (surfaces) 220. Then, the three-dimensional puzzle 206 is also considered not as a set of blocks 208 but as a set of surfaces 220.

As shown in FIG. 8, assuming that the three-dimensional puzzle 206 is 3*3*3, planes of x=1, x=2, x=3 which take a positive direction of an x axis of the block coordinate system as a front are considered. Then, it is considered that each of the planes is in the form of grid, and a surface 220 is put over a piece of the grid where the block 208 exists. Similarly, planes (y=1, y=2, y=3) which take a positive direction of a y axis as a front, and planes (z=1, z=2, z=3) which take a positive direction of a z axis as a front are also considered. In addition, although omitted in FIG. 8, planes (x=0, x=1, x=2) which take a negative direction of the x axis, planes (y=0, y=1, y=2) which take a negative direction of the y axis as a front, planes (z=0, z=1, z=2) which take a negative direction of the z axis as a front are also considered. That is, it is considered that there are 18 grid-shaped planes in all.

Figure 9:
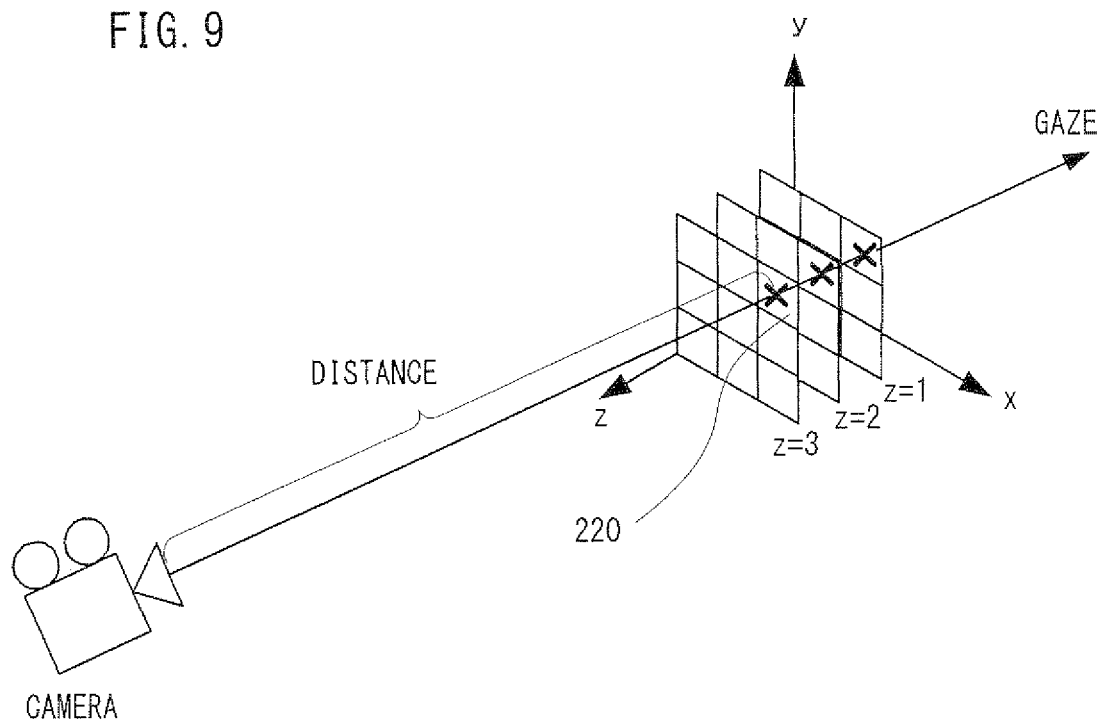
FIG. 9 is an illustrative view showing an intersection determination between a gaze and planes.

Next, an intersection point between the gaze and each plane is calculated, and then it is searched whether or not the surface 220 is put over the intersection point. Lastly, the closest surface 220 to the viewpoint out of the surfaces 220 intersected with the gaze is determined according to the distances from the viewpoint. Then, the block 208 to which the closest surface 220 belongs is specified as a block 208 touched by the user. FIG. 9 shows intersections between the planes in the z axis (z=1, z=2, z=3) and a gaze as one example. In a case of the relationship between the camera and the intersection points as shown in FIG. 9, the intersection point in the plane of z=3 is the closest to the camera, and thus, the block 208 to which the surface 220 belongs to is specified as a designated block 208.

In concrete calculation, an integer (x=1, x=2, x=3) of x is substituted in a linear expression of the gaze to evaluate y and z, and to thereby acquire coordinates of the intersection points between the gaze and the respective planes in the positive direction of the x axis. Similarly, coordinates of the intersection points between the respective planes (y=1, y=2, y=3) in the positive direction of the y axis and the gaze, and coordinates of the intersection points between the respective planes (z=1, z=2, z=3) in the positive direction of the z axis and the gaze are also calculated. Thus, nine coordinates of the intersection points can be acquired with respect to the planes in the positive directions of the x, y, z axes. Similarly, coordinates of the intersection points between the planes in the negative direction of the x, y, z axes and the gaze are calculated as well.

From the coordinates of the intersection points, a coordinate value of the block 208 of the block coordinate system is calculated to thereby acquire an index number IB of the block 208 by a computation expression according to an equation 1.

$$IB = x + y*(xsize) + z*(xsize)*(ysize) \quad (1)$$

Here, xsize and ysize are respectively a size in the x axis direction and a size in the y axis direction of the three-dimensional puzzle 206. In a case of the three-dimensional puzzle 206 of 3*3*3 in FIG. 8, both of the sizes in the x axis direction and the y axis direction are 3.

It is determined whether or not there is a block 208 on the basis of the calculated index number. In the block data, the information on whether or not there is a block 208 is stored by being brought into correspondence with the index number of the array, and therefore, it is possible to perform the determination with reference to the block data. In a case that a plurality of blocks 208 exist, the block 208 which is the closest to the camera is determined to be the touched block 208.

In this way, by calculating the intersection point between the gaze calculated from the touched position and the respective surfaces of the block 208, the block 208 touched by the user is specified, and therefore, it is possible to designate the pointed block 208 out of the plurality of blocks 208 composed of the three-dimensional puzzle with a simple processing.

Furthermore, in this embodiment, according to a predetermined operation by the user, the three-dimensional puzzle 206 is configured to be rotated. More specifically, according to a sliding touch operation, the amount of rotation of the three-dimensional puzzle 206 is changed. The sliding touch operation is an operation of moving a touched position (designated position) with the touch panel 24 touched. Here, in this embodiment, since the slicer 218 is displayed, the sliding touch operation has to be made at a position except for where the slicer 218 exists.

In calculating the amount of rotation, an amount of movement (dragging value) of the current sliding touched position is first calculated with respect to each of the X axis direction and Y axis direction of a coordinate system of the touch panel 24. The coordinate system of the touch panel 24 is a coordinate system, taking the upper left corner of the touch panel 24 as an origin, and taking a right direction of the touch panel 24 as an X axis and a downward direction thereof as a Y axis direction.

A dragging value Dx in the X direction is an amount of change from the designated position in the X direction, and can be calculated by subtracting a currently touched position (X coordinate) from a previously touched position (X coordinate). A dragging value Dy in the Y direction is an amount of change from the designated position in the Y direction, and can be calculated by subtracting a currently touched position (Y coordinate) from a previously touched position (Y coordinate).

The dragging value is transformed into an amount of rotation (roll value). A different arithmetic expression is used depending on a threshold value such that the three-dimensional puzzle 206 is slowly rotated when the touched position is slowly slid, and it is quickly rotated when the touched position is quickly slid. That is, when the dragging value is equal to or less than a predetermined threshold value T, a roll value Rx is calculated according to an equation 2, and when the dragging value is above the predetermined threshold value T, the roll value Rx is calculated according to an equation 3. Ry is also calculated from similar arithmetic expressions.

$$Rx = Dx * A \quad (2)$$

$$Rx = (Dx - T) * B + T * A \quad (3)$$

Here, A and B are coefficients, taking predetermined values.

Lastly, the roll value is added to the amount of rotation of the three-dimensional puzzle 206. That is, the roll value Rx is added to an amount of rotation about the y axis of the block coordinate system of the three-dimensional puzzle 206, and the roll value Ry is added to an amount of rotation about the x axis of the block coordinate system of the three-dimensional puzzle 206. When the block coordinate system is transformed into the world coordinate system, a rotating matrix corresponding to the amount of rotation is multiplied, and therefore, the three-dimensional puzzle 206 on which a rotating operation is reflected is displayed.

Figure 10:
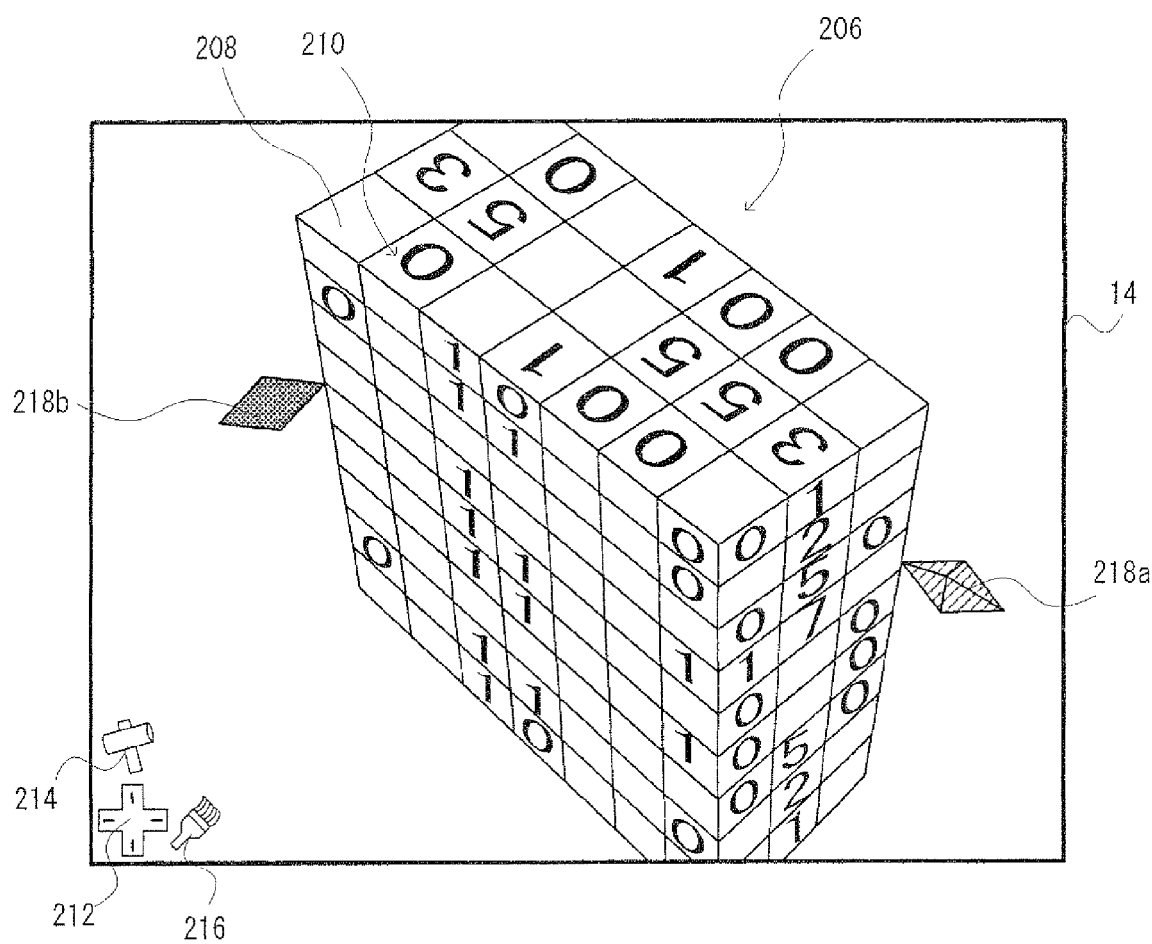
FIG. 10 is an illustrative view showing one example of a screen including a three-dimensional puzzle which is rotated by a rotating operation.

Accordingly, the user can intuitively perform a rotating operation of the three-dimensional puzzle 206 according to a sliding touch operation. For example, as shown in FIG. 10, since the three-dimensional puzzle 206 which is rotated in varying directions can be displayed, it is possible to confirm blocks 208 and hint numerals 210 which are not displayed at an initial state shown in FIG. 3, and it is possible to perform deletion and marking on these blocks 208.

Noted that the rotating operation is not restricted to a sliding touch operation, and may be performed by another operation in another embodiment. For example, it may be performed according to an operation by the operating switch 22. More specifically, the three-dimensional puzzle 206 may be rotated about the y axis of the block coordinate system according to an operation with the action switch 22R, and may be rotated about the x axis of the block coordinate system according to an operation with the action switch 22L.

Furthermore, in this embodiment, as described above, the slicer 218 is provided, and by operating the slicer 218, the blocks 208 inside the three-dimensional puzzle 206 are displayed. As shown in FIG. 3, in this embodiment, two slicers 218a and 218b are displayed. The slicers 218a and 218b are for designating a position from which the blocks 208 are to be undisplayed in the x axis direction and the z axis direction of the block coordinate system of the three-dimensional puzzle 206. The slicer 218 can be operated by a sliding touch operation, that is, by touching the slicer 218 and moving the touched position, it is possible to move the slicer 218. Here, the slicers 218a and 218b can be moved in only the x axis direction and the z axis direction of the block coordinate system.

Figure 11:
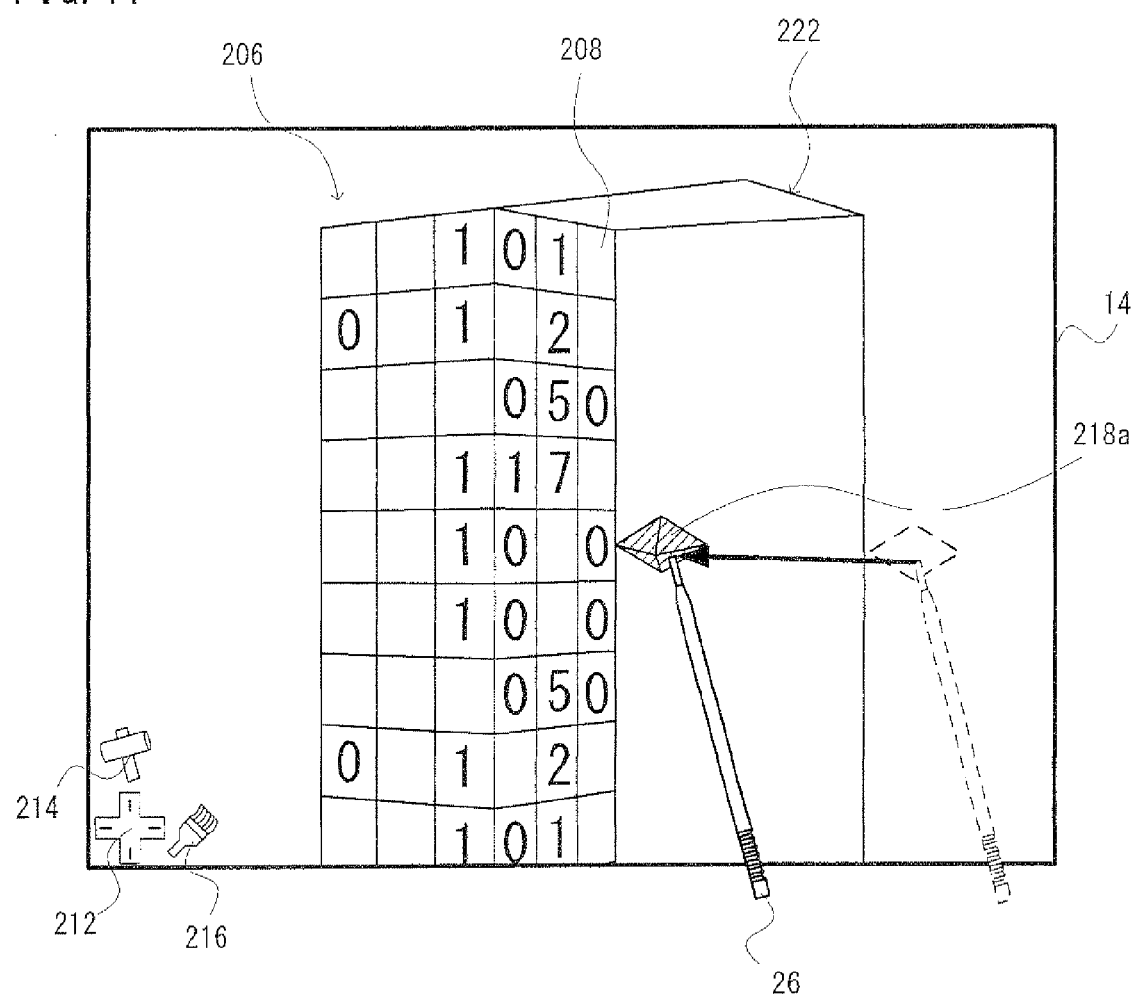
FIG. 11 is an illustrative view showing one example of a screen including blocks inside the three-dimensional puzzle displayed according to an operation with a slicer.

FIG. 11 shows one example of the three-dimensional puzzle 206, inside of which is displayed by a movement of the slicer 218a in the x axis direction. For example, the slicer 218a is moved in the negative direction of the x axis according to a sliding touch operation. In the three-dimensional puzzle 206, the blocks 208 existing in the positive direction of the x axis from the position of the slicer 218a are undisplayed. Accordingly, a cross-section of the three-dimensional puzzle 206 along the position of the slicer 218a is displayed, and a deleting or a marking instruction can be performed on the blocks 208 along the cross-section.

During execution of the slicer 218 processing, similar to deleting and marking the block 208, the touched coordinates is first transformed into the world coordinate system, and then, a gaze is calculated from a line connecting the camera and the touched coordinates. Next, the gaze is transformed from the world coordinate system to the block coordinate system. Successively, a intersection determination is performed between the gaze and the slicer 218. That is, it is determined whether or not the slicer 218 is designated by the user.

Here, during execution of the intersection determination of the slicer 218, an intersection determination is first performed between the block 208 and the gaze. This is because that in this embodiment, the slicer 218 may be hidden under the blocks 208, but on the contrary, the slicer 218 is never displayed in front of the block 208. If the gaze is first intersected with the block 208, it is determined that the gaze does not intersect with the slicer 218. Furthermore, in this embodiment, the slicer 218 is formed in an octahdron, but in the intersection determination between the slicer 218 and the gaze, for simplifying the processing, assuming that the shape of the slicer 218 for determination is a sphere, an intersection determination between the gaze and the sphere is performed. The radius of the sphere is set to a size large enough to include the slicer 218.

If it is determined that the gaze intersects with the slicer 218, the coordinate value of the slicer 218 is updated on the basis of the amount of movement of the sliding touch. For example, by taking the touched coordinates when touching the slicer 218 is started as a reference point, the amount of the movement of the sliding touch is calculated on the basis of the reference point and the current touched coordinates. The amount of the movement is calculated as a vector from the reference point to the current designated position, and includes components of a length and direction as to the movement. The amount of the movement (moving vector) is calculated in the world coordinate system. In addition, it is transformed into the block coordinate system to thereby calculate the amount of the movement (moving vector) of the block coordinate system. Then, if the touched slicer 218 is the slicer 218a for instructing undisplay in the x axis direction, an amount of the movement in the x axis (length and direction) of the block coordinate system is calculated on the basis of the calculated amount of the movement and the position of the slicer 218a when the touch is started, so that an x coordinate value of the slicer 218a is calculated. Alternatively, if the touched slicer 218 is the slicer 218b for instructing undisplay in the z axis direction, an amount of the movement in the z axis (length and direction) of the block coordinate system is calculated on the basis of the calculated amount of the movement and the position of the slicer 218b when the touch is started, so that a z coordinate value of the slicer 218b is calculated.

The coordinate value of the slicer 218 is retained in the block coordinate system similar to the block 208, and thus, whether or not each block 208 is undisplayed can be easily determined by the coordinate value of the block coordinate system. In a case of the slicer 218a, a block 208 with an index number corresponding to an x coordinate value being equal to or more than the x coordinate value of the slicer 218a is undisplayed. That is, out of the array of the block data, the blocks 208 whose X axis are after the row corresponding to the x coordinate value of the slicer 218a are undisplayed. Similarly, with respect to the slicer 218b, on the basis of the z coordinate value of the slicer 218b, blocks 208 to be undisplayed are specified to thereby undisplay the blocks 208.

In addition, as shown in FIG. 11, at the undisplayed part of the three-dimensional puzzle 206 by means of the slicer 218, a wireframe 222 is displayed. Displaying the wireframe 222 can show not that some blocks 208 are deleted, but that they are merely temporarily undisplayed according to an operation of the slicer 218. This wireframe 222 is displayed by drawing the outermost (contour) of the polygons which are turned to the back and cannot be viewed in general. More specifically, the three-dimensional puzzle 206 before the blocks 208 are cut away is regarded as one large block. In displaying the block, only the polygons which turn to the front is generally drawn, but in this case, only the contour of the polygons which turn to the back are drawn without drawing the polygons which turn to the front. Here, the front and back of the polygons are decided in the arranging order of the respective vertexes forming the polygon from the viewpoint, and in a case that they are viewed counterclockwise, the front is defined, and in a case that they are viewed clockwise, the back is defined.

Thus, with a simple operation performed on the slicer 218, it is possible to display any blocks 208 inside the three-dimensional puzzle 206, and perform a deleting instruction and a marking instruction on the blocks 208 inside the three-dimensional puzzle 206 as well.

Noted, in another embodiment the slicer 218 for designating a position where the blocks 208 are to be undisplayed in the y axis direction of the block coordinate system may be further provided. Or, the slicer 218 of the y axis direction may be provided in place of the slicer 218*a* of the x axis direction or the slicer 218*b* of the z axis direction.

Figure 12:
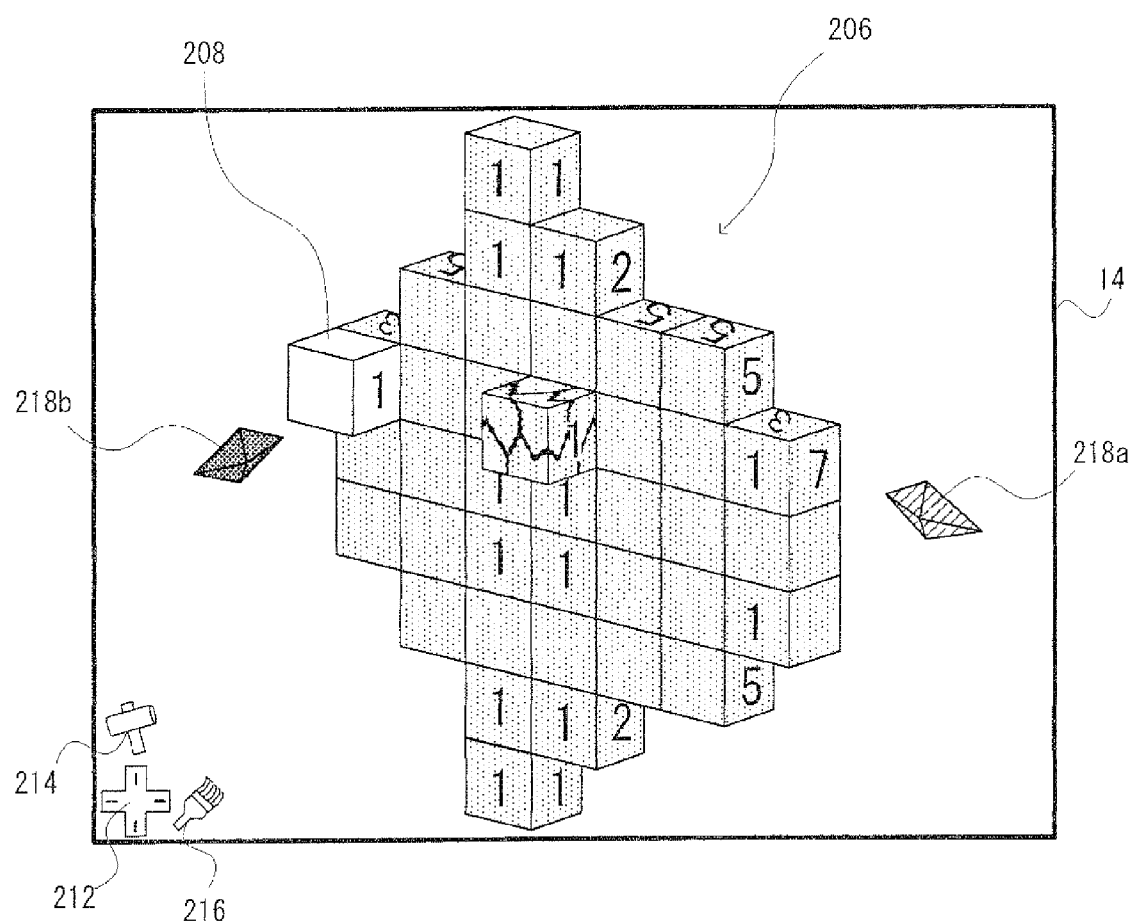
FIG. 12 is an illustrative view showing one example of a screen including a three-dimensional puzzle directly before it is solved.

Thus, in the three-dimensional puzzle game, while rotating the three-dimensional puzzle 206 according to a sliding touch operation and displaying the block 208 inside the three-dimensional puzzle 206 by means of the slicer 218, the user deletes an unnecessary block 208 from the three-dimensional puzzle 206 and marks a block to be left 208 according to a deleting instruction and a marking instruction, to thereby solve the three-dimensional puzzle 206. FIG. 12 shows one example of a screen directly before the three-dimensional puzzle 206 is solved. All the blocks 208 except for one block 208 at the left end of the three-dimensional puzzle 206 are marked. The marked blocks 208 are the block to be left 208, and the block 208 at the left end which has not been marked yet is an unnecessary block. Accordingly, when a deleting instruction is performed on the block 208 at the left end in FIG. 12, the three-dimensional puzzle 206 is to be solved.

Figure 13:
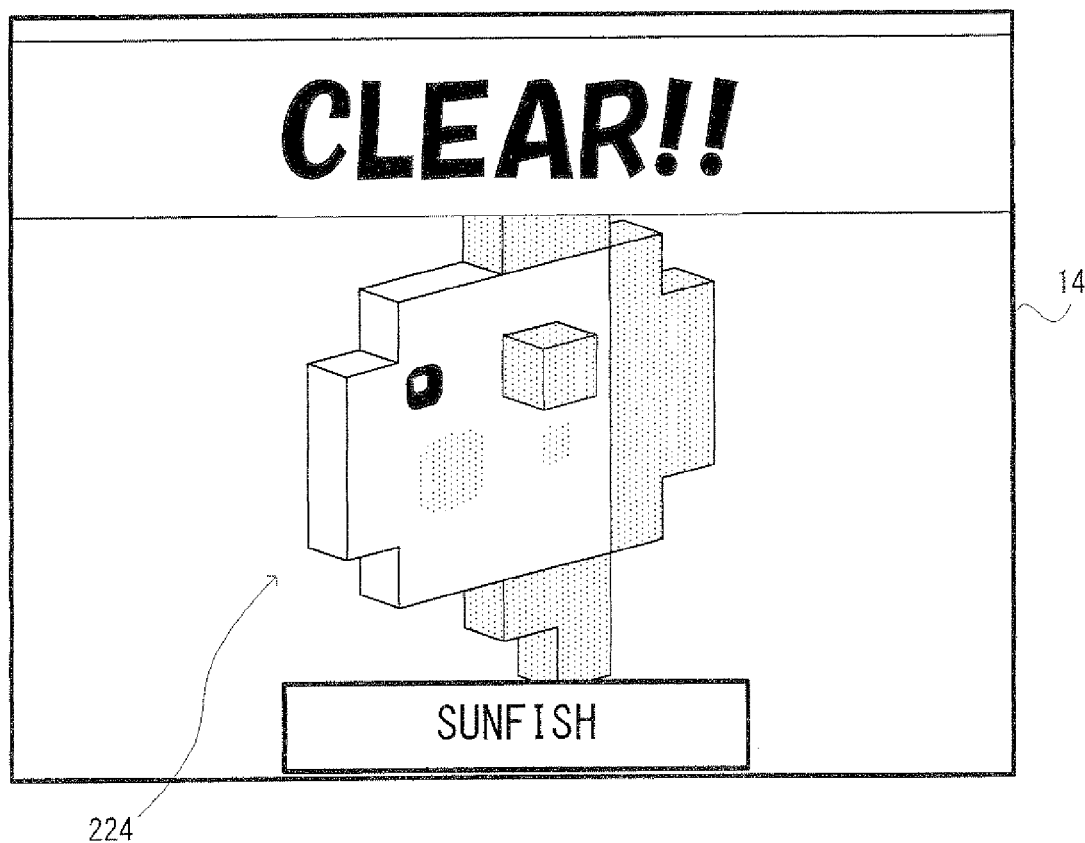
FIG. 13 is an illustrative view showing one example of a screen including a completed model.

When it is determined that all the remaining blocks 208 are determined to be the block to be left 208, the three-dimensional puzzle 206 is solved to complete a predetermined three-dimensional model. FIG. 13 shows one example of a screen on which the completed three-dimensional model 224 is displayed. In FIG. 13, the answer of the three-dimensional puzzle 206 is the three-dimensional model 224 of a sunfish, and on the screen, texts indicating the model name and "clear" are displayed. In the three-dimensional model 224, the color of each block 208 is changed to a color when it is completed. Here, the three-dimensional model 224 may be displayed not by utilizing block data, but by being replaced with 3D model data prepared in advance. This makes it possible to make coloring and textures of the three-dimensional model 224 more appropriate and colorful.

On the other hand, before the three-dimensional model 224 is completed, if a game over condition is satisfied, the game is to be over, and a screen representing a game over is displayed. FIG. 14 shows one example of a screen when the game is over. FIG. 14 shows a case that the number of mistakes is above a restrictive number. On the upper screen, all the five blocks 204 representing the mistake allowable number are displayed with an image indicating a mistake. On the lower screen, the text of "game over" is displayed. Here, if a game over condition relative to the time limit is satisfied, a text of "time up", for example, is displayed on the lower screen.

Figure 15:
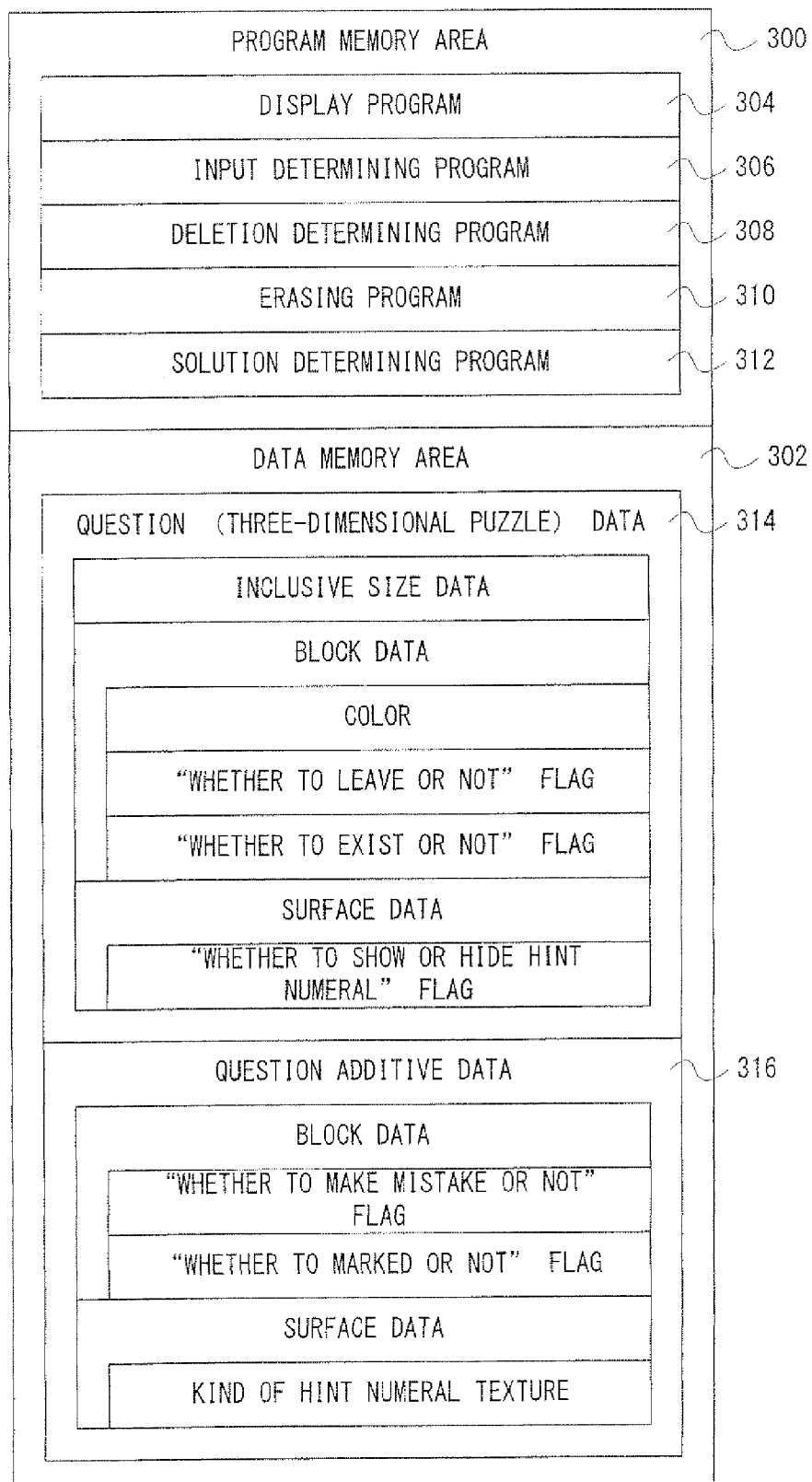
FIG. 15 is an illustrative view showing a part of one example of a memory map.
Figure 16:
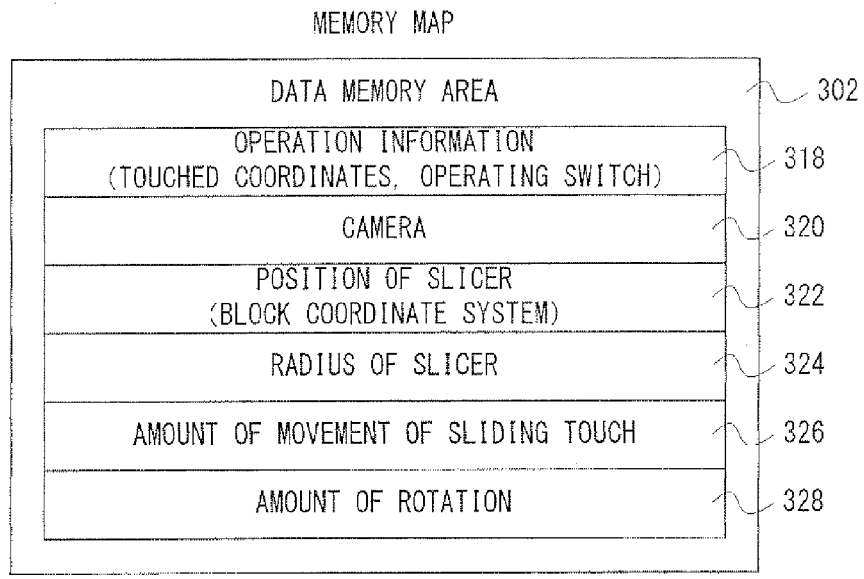
FIG. 16 is an illustrative view showing another part of the one example of the memory map.

FIG. 15 and FIG. 16 show one example of a memory map of the game apparatus 10. The memory map includes a program memory area 300 and a data memory area 302. The program memory area 300 stores programs in the ROM 28*a*. The data memory area 302 stores data stored in advance in the ROM 28*a* and data generated or taken according to the processing. Here, FIG. 15 and FIG. 16 show a part of the memory map, and the program memory area 300 and the data memory area 302 store other programs and data necessary for executing the processing.

A memory area 304 stores a display program. The display program is for drawing and displaying a screen including the three-dimensional puzzle 206 composed of the plurality of blocks 208 and hint numerals 210, etc.

The memory area 306 stores an input determining program. The input determining program is for determining what kind of instruction is performed by the user on the basis of the input information. The input information includes data as to whether each operating switch 22 is pressed, data as to the presence or absence of a touch on the touch panel 24, and coordinate data of the touched position. Acquiring the input information is performed at regular time intervals (one frame=1/60 seconds, for example). On the basis of the input information, it is determined whether or not an instruction of deleting a block 208 is performed, whether or not a marking instruction to a block 208 is performed, whether or not an instruction of rotating the three-dimensional puzzle 206 is performed, or whether or not the slicer 218 is operated.

A memory area 308 stores a deletion determining program. The deletion determining program is for determining whether or not the designated block 208 is the block to be left 208 when a deleting instruction is performed. In this embodiment, with respect to each block 208, a flag as to whether or not the block 208 is to be left is stored, so that it is possible to specify the designated block 208, and perform the determination on it with reference to the flag.

A memory area 310 stores an erasing program. The erasing program is for erasing a block 208 which is not determined to be a block to be left 208. In this embodiment, in the block data, a flag indicating whether or not each block 208 exists in the three-dimensional puzzle 206 is stored, and when a block 208 on which a deleting instruction is performed is not the block to be left 208, the block 208 is erased by turning the flag off.

A memory area 312 stores a solution determining program. The solution determining program is for determining whether or not the three-dimensional puzzle 206 as a question is solved, that is, whether or not the three-dimensional model 224 is completed by determining whether or not all the remaining blocks 208 in the three-dimensional puzzle 206 are the blocks to be left.

A memory area 314 stores question data (three-dimensional puzzle data). The question data is data stored in the ROM 28*a* in advance, that is, static data. Here, a plurality of question data may be stored in advance for each level of the questions (difficulty level), for example. Alternately, the question data may be data which is downloaded from the server via a network so as to be stored into the RAM 28*b* or the RAM 42.

The question data includes inclusive size data, block data, and surface data. The inclusive size data indicates that how many blocks 208 in each of the x, y, and z axes of the block coordinate system (x, y, z pieces) the three-dimensional puzzle 206 as a question is composed by. In this embodiment, the three-dimensional puzzle 206 is formed by a rectangular parallelepiped shape, and thus, such the inclusive size data is stored.

The block data stores block information indicating information relative to each block 208 included in the three-dimensional puzzle 206. The block data includes block information of x*y*z each of which is formed by being arranged in the x axis, y axis, z axis in the block coordinate system in this order. As described above, the block data has a memory area necessary for the respective blocks 208 of the three-dimensional puzzle 206 having a predetermined maximum size (10*10*10, for example). That is, the block data is an array of block information of the maximum size, and the index number of the array corresponds to a coordinate value of the block coordinate system.

Each block information includes a color, a "whether to leave or not" flag, and a "whether to exist or not" flag. The color is color information applied to the block 208 when the three-dimensional puzzle 206 is solved. However, as described above, in a case that the 3D model data of the three-dimensional model 224 is separately stored, the color information is not used. The "whether to leave or not" flag is a flag to indicate whether or not the block 208 is to be left, that is, it is information indicating whether a deletion is right or wrong. With respect to the block to be left 208, the flag is turned on, and with respect to the block 208 to be deleted, the flag is turned off. By the "whether to leave or not" flag, whether a deleting instruction as to each block 208 is right or wrong is determined, and therefore, it is possible to make a determination with a simple operation.

The "whether to exist or not" flag is a flag to indicate whether or not a block 208 exists. As described above, the index number of the array corresponds to a coordinate value of the block coordinate system, that is, each block information is brought into correspondence with an arrangement position of each block 208 in the block coordinate system. Accordingly, with respect to the arrangement position where a block 208 is placed in the three-dimensional puzzle 206, the flag is turned on, and with respect to the arrangement position where a block 208 is not placed, the flag is turned off. In a case that a block 208 is deleted by a deletion instructing operation by the user, the "whether to exist or not" flag corresponding to the block 208 is switched from on to off.

The surface data stores surface information indicating information relative to a hint numeral 210 displayed on a surface of the block 208. In this embodiment, the block 208 is a cube and has six surfaces, and thus, the surface information is basically stored for each six surfaces of each block 208. Accordingly, the surface data includes surface information of x*y*2, x*z*2, and y*z*2.

The hint numeral 210 indicates the number of blocks to be left 208 in the block row. The hint numeral 210 is, in this embodiment, displayed on surfaces being opposed to each other in the block row, that is, surfaces vertical to the direction of the row. Since the hint numeral 210 is displayed on the surfaces vertical to the direction of the block row composed of the respective blocks 208, it is possible to easily recognize the hint numeral 210 for each block row. Furthermore, in a case that the hint numeral 210 is displayed on both of the surfaces being opposed to each other, the hint numeral 210 is displayed on both sides in the same block row, and therefore, it is possible to more easily confirm the hint numeral 210.

With respect to the hint numeral 210, each surface information includes a "whether to show or hide a hint numeral" flag. The "whether to show or hide a hint numeral" flag is a flag to indicate whether or not the hint numeral 210 is displayed on the surface, and with respect to a surface on which a hint numeral is displayed, the flag is turned on, and with respect to a surface on which a hint numeral is not displayed, the flag is turned off. Whether or not on which surface a hint numeral 210 is to be displayed is set in advance by a creator of the questions or a manufacturer.

Here, since the two opposing surfaces are arranged in the same block row in the direction of the row, the same hint numeral 210 is applied to the two opposing surfaces. If whether to show or hide the hint numeral 210 is made common to the two opposing surfaces, it is enough to store surface information relative to one surface. Accordingly, in such a case, x*y, x*z, y*z surface information is enough as the surface data.

A memory area 316 stores question additive data. The question additive data is additive information dynamically generated according to the processing on the basis of the above-described static question data. The question additive data includes block data and surface data similar to the static question data.

The block data includes a "whether to make a mistake or not" flag and a "whether to be marked or not" flag for each block 208. The "whether to make a mistake or not" flag is a flag for indicating whether or not a deleting instruction of the block 208 is erroneously made. When a deleting instruction is performed on the block 208 in spite of this block 208 being the block to be left, the flag is switched from off to on.

Furthermore, the "whether to be marked or not" flag is a flag for indicating whether or not the block 208 is marked. In a case that a block 208 is not marked, when a marking instruction is performed on it, the flag is switched from off to on. On the other hand, in a case that a block 208 is marked according to a marking instruction, when a marking instruction is performed again on it, the flag is switched from on to off. In addition, when in spite of the block 208 being the block to be left, a deleting instruction is performed (that is, a deleting instruction is erroneously made) as well, it is clear that the block 208 is the block to be left 208 as described above, and thus, the flag is switched from off to on.

Furthermore, in a case that a block 208 for which this "whether to be marked or not" flag is turned on, when a deleting instruction is performed on the block 208, deleting processing against the block 208 is inactivated. Accordingly, if the user marks a block 208 which is determined not to be deleted, that is, a block 208 which he or she does not want to delete, it is possible to prevent a block 208 from being accidentally deleted due to an erroneous operation.

The surface data includes information of the kind of the hint numeral texture on each surface. The hint numeral texture is texture data for displaying a hint numeral 210 on a surface of a block 208, and stores a hint numeral texture for each numeral in advance. Since the hint numeral 210 of each surface of each block is for indicating the number of blocks to be left 208 in the block row, the hint numeral 210 of each surface is calculated on the basis of the "whether to exist or not" flag of the block data included in the static question data. Then, surface data indicating information for designating the kind of the hint numeral texture is generated for each surface of each block 208 and stored in the memory area 316. In this embodiment, since a hint numeral 210 on each surface is calculated from information indicating whether deleting each block 208 making up of each block row is right or wrong, and then, the information of the kind of the hint numeral texture on each surface is generated, it is possible to save a memory capacity for storing hint information in advance.

Additionally, a texture for indicating mere numerals shown in FIG. 3, or the like is used at a time when a plurality of blocks to be left 208 are successively arranged in the block row. Furthermore, when a plurality of blocks to be left 208 are intermittently arranged in the block row, a texture displaying a circled numeral is used, for example.

FIG. 16 shows another area of the data memory area 302 out of the memory map. A memory area 318 stores operation information (input information). The operation information includes information relative to be touched coordinates and the presence or absence of a touch as operation data taken from the touch panel 24 as described above. Furthermore, the operation information includes information indicating whether or not each operating switch 22 is pressed as operation data taken from the operating switch 22.

A memory area 320 stores information relative to a camera for drawing the virtual three-dimensional space. The camera information includes coordinates of a viewpoint in the world coordinate system. The information relative to coordinates of a gazing point, viewing direction, etc. is further stored. In this embodiment, the viewpoint is fixed at a predetermined position.

A memory area 322 stores position data of the slicer 218. The position data of the slicer 218 includes a coordinate value indicated by the block coordinate system. In this embodiment, data relative to the slicer 218a movable in the x-axis direction of the block coordinate system and the slicer 218b movable in the z-axis direction thereof are stored. The initial coordinate values of the slicers 218a and 218b are, for example, respectively coordinate values corresponding to the arrangement positions next to the blocks 208 at the leading edge of the x and z axis direction of the three-dimensional puzzle 206. Here, a coordinate value corresponding to a predetermined arrangement position, such as at the center of the y axis direction of the three-dimensional puzzle 206, for example, is set to a coordinate value of the y axis. The coordinate values of the x axis or the z axis are updated according to a sliding operation of the slicer 218. By comparing the coordinate value of the slicer 218 and the coordinate value of the block 208 with each other, it is possible to determine whether the block 208 is to be undisplayed or not.

A memory area 324 stores radius data of the slicer 218. When a intersection determination between the slicer 218 and the gaze is made, the slicer 218 is taken as a sphere, and the radius data of the sphere is stored in the memory area 324.

A memory area 326 stores an amount of movement of a sliding touch. The amount of movement of the sliding touch is dragging values Dx, and Dy in the x axis direction and the y axis direction on the touch panel 24 as described above, and calculated by subtracting a currently touched position from a previously touched position for each x axis direction and y axis direction.

A memory area 328 stores an amount of rotation of the three-dimensional puzzle 206. More specifically, the amount of rotation about the x axis of the block coordinate system and the amount of rotation about the y axis thereof are stored. When a sliding touch operation, that is, when a rotating operation is made, roll values Rx, Ry are respectively evaluated from the above-described amounts of movement Dx, Dy of the sliding touch according to the equation 2 and the equation 3. Then, the roll value Rx is added to the amount of rotation about the y axis of the three-dimensional puzzle 206, and the roll value Ry is added to the amount of rotation about the x axis of the three-dimensional puzzle 306. When the three-dimensional puzzle 206 is placed in the world coordinate system for display, a rotating matrix corresponding to the amount of rotation is calculated, and used together with a transformation matrix from the block coordinate system to the world coordinate system. Accordingly, the three-dimensional puzzle 206 rotated according to the amount of rotation is displayed.

Although not shown in FIG. 15 and FIG. 16, the data memory area 302 also stores image data of various objects such as the blocks 208, the slicer 218, etc. and other data necessary for processing such, as a hint numeral texture, various flags, counters, etc.

Figure 18:
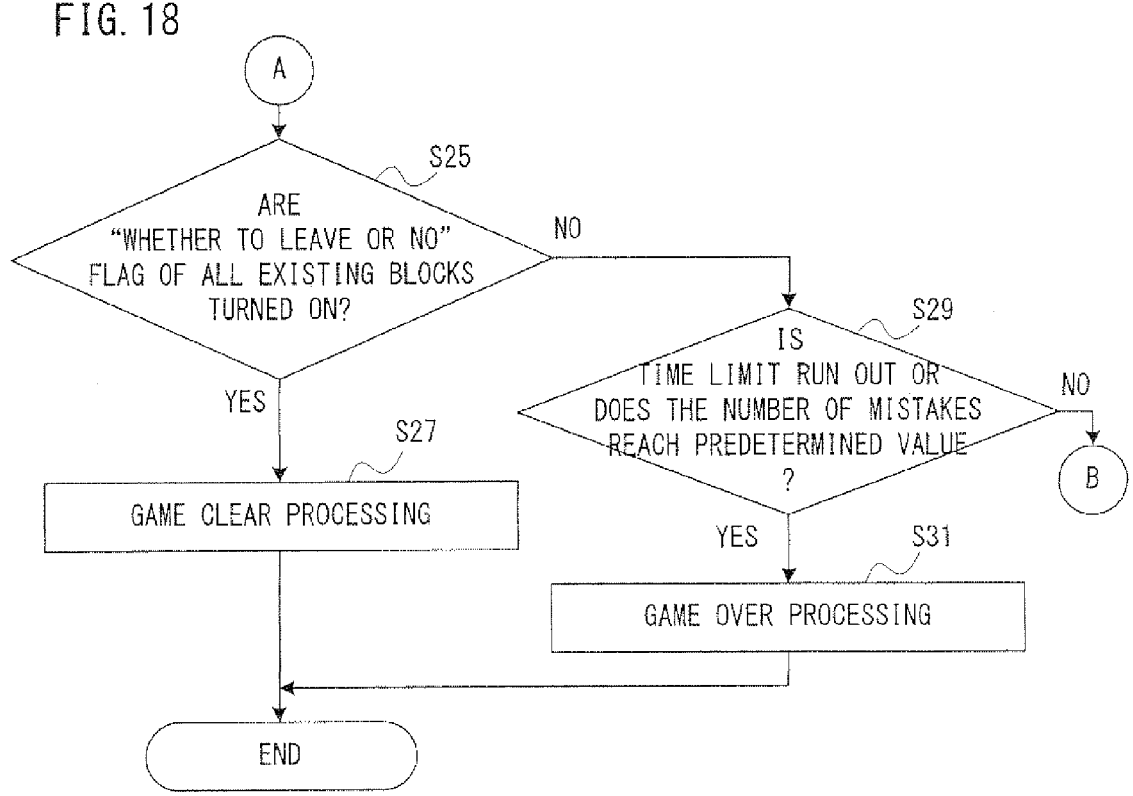
FIG. 18 is a flowchart showing a sequel from FIG. 17.
Figure 17:
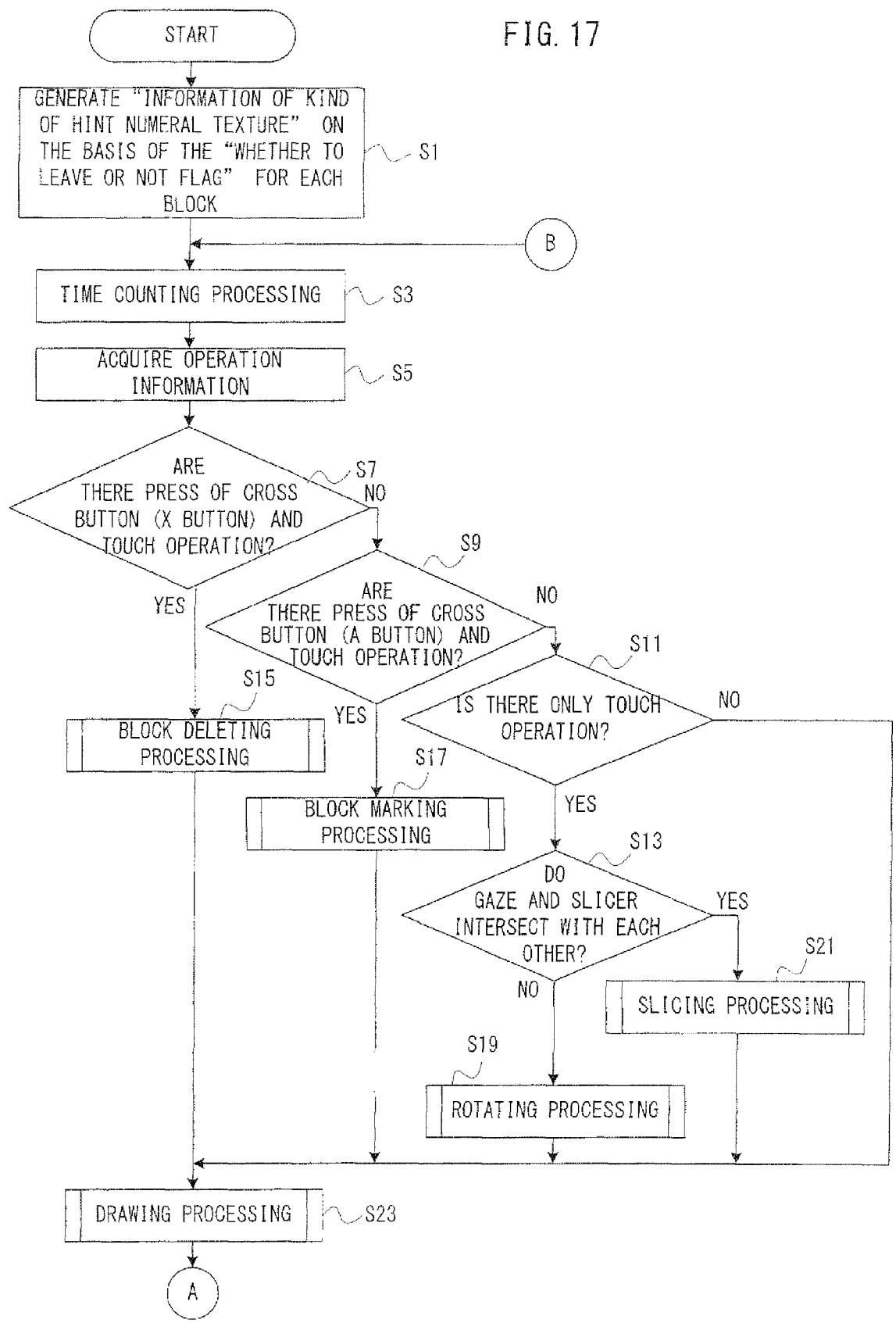
FIG. 17 is a flowchart showing a part of an example of an operation of the game apparatus.

FIG. 17 and FIG. 18 show one example of an operation of the game apparatus 10. When starting game processing, the CPU core 34 generates "information on the kind of the hint numeral texture" on the basis of the "whether to leave or not" flag for each block 208 in a step S1. In this embodiment, the hint numeral 210 is for indicating the number of blocks to be left 208 from the block row, and therefore, by calculating the number of blocks 208 existing in each block row arranged in the x axis, y axis, and z axis directions of the three-dimensional puzzle 206, that is, the number of blocks 208 for which the "whether to leave or not" flag is turned on, it is possible to calculate hint numerals 210 on the respective surfaces being vertical to each other in the block row of the respective blocks 208. Then, the kind of the hint numeral texture is decided for each surface of each block 208, and the kind of the hint numeral texture of each surface is stored as surface data in the memory area 316.

The processing after a next step S3 is executed per unit of time (one frame) until the game clear condition is satisfied in a step S25 in FIG. 18, or until the game over condition is satisfied in a step S29.

In the step S3, the CPU core 34 executes time counting processing. Thus, an elapsed time from the start of the game is counted.

In a step S5, the CPU core 34 acquires operation information. More specifically, operation data from the operating switch 22 and operation data from the touch panel 24 are taken and stored in the memory area 318. In succeeding steps S7, S9, S11 and S13, the kind of the operation (input) performed by the user is determined on the basis of the taken operation information.

In the step S7, the CPU core 34 determines whether or not a touch operation (input) is performed via the touch panel 24 at the same time that the upward direction of the cross switch (direction instructing switch) 22a or the X button 22f is pressed (or in a state it is pressed). If "YES" in the step S7, that is, if it is determined that an operation for a deleting instruction is performed, the CPU core 34 executes block deleting processing in a step S15 in FIG. 19 described later.

On the other hand, if "NO" in the step S7, the CPU core 34 determines whether or not a touch operation is performed on the touch panel 24 at the same time the right direction of the cross switch 22a or the A button 22d is pressed (or in a state that it is pressed) in the step S9. If "YES" in the step S9, that is, if it is determined that an operation for a marking instruction is performed, the CPU core 34 executes block marking processing in a step S17 in FIG. 20 described later.

On the other hand, if "NO" in the step S9, the CPU core 34 determines whether or not only a touch operation is performed on the touch panel 24 in the step S11. If "YES" in the step S11, the CPU core 34 determines whether or not a gaze and the slicer 218 intersect with each other in the step S13. That is, it is determined whether a rotating operation is performed, or the slicer 218 is operated.

As to the intersection determination of the slicer 218, as described above, the touched coordinates are transformed into the coordinates of the world coordinate system. A gaze is calculated from the transformed touched coordinates and the coordinates of the camera in the memory area 320, and moreover, the gaze is transformed into the block coordinate system. Then, the intersection between the transformed gaze and each surface of each the block 208 of the three-dimensional puzzle 206 is checked. If the gaze and each block 208 do not intersect with each other, the intersection between the gaze and the slicer 218 (218a, 218b) is checked. The slicer 218 is regarded as a sphere, and it is determined whether or not the slicer 218 as a sphere and the gaze intersect with each other on the basis of the coordinates stored in the memory area 322 and the radius stored in the memory area 324.

If "NO" in the step S13, that is, if it is determined that a rotating operation is performed by the user, the CPU core 34 executes rotating processing in FIG. 21 described later in a step S19.

On the other hand, if "YES" in the step S13, that is, if it is determined that an operation of the slicer 218 is performed by the user, the CPU core 34 executes slicing processing in FIG. 22 described later in a step S21. Alternatively, if "NO" in the step S11, that is, if a predetermined operation is not performed, the process directly proceeds to a step S23.

Figure 19:
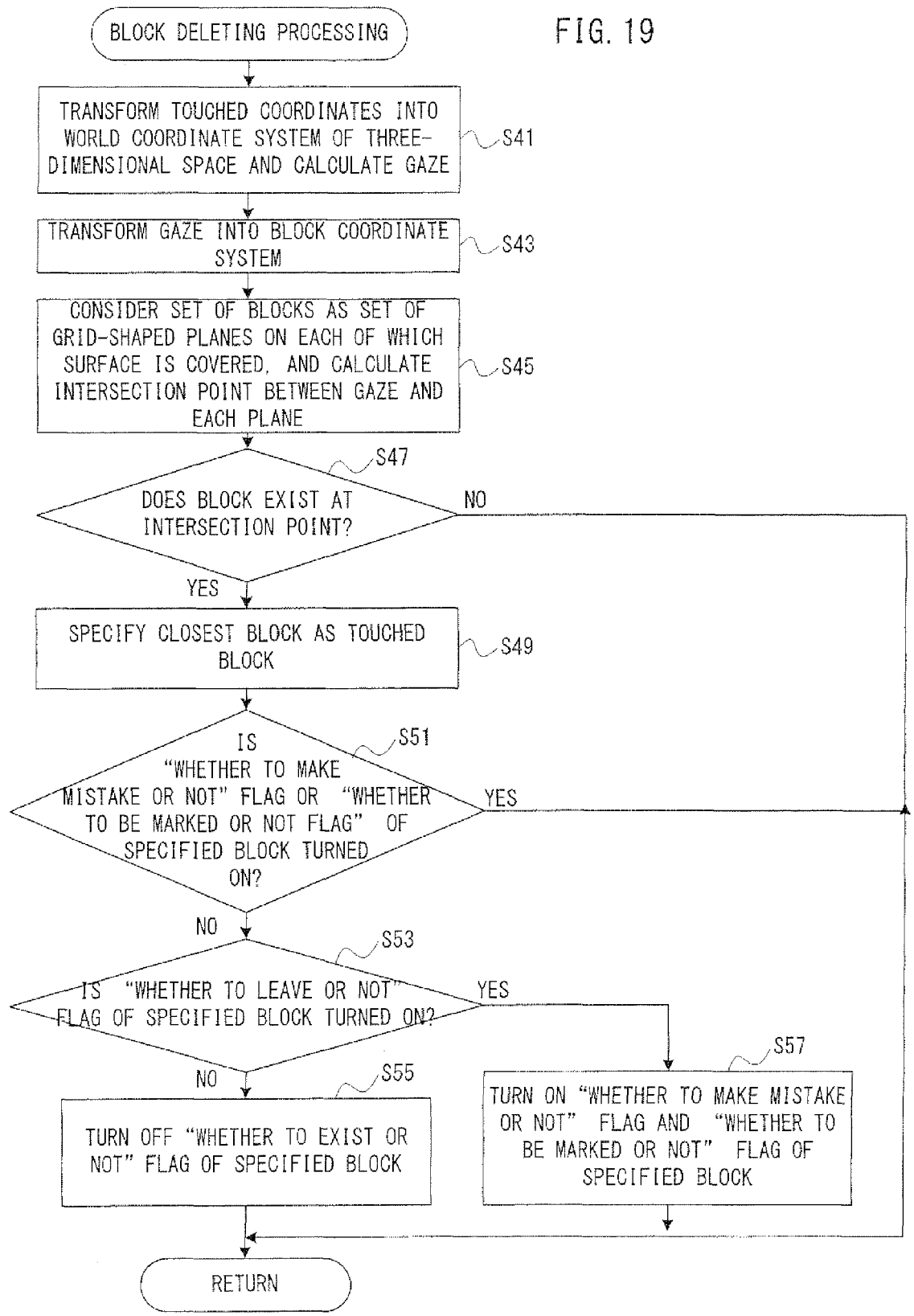
FIG. 19 is a flowchart showing one example of an operation of block deleting processing in FIG. 17.

FIG. 19 shows one example of an operation of the block deleting processing in the step S15 (FIG. 17). When starting the block deleting processing, the CPU core 34 transforms the touched coordinates into the world coordinate system in the three-dimensional space to thereby calculate a gaze in a step S41. The linear expression of the gaze is calculated from the transformed three-dimensional touched coordinates and the camera coordinates. Here, the transformation matrix from the coordinate system of the touch panel 24 to the world coordinate system is calculated by the position of the virtual camera and the position of the touch panel 24 (virtual screen), but in this embodiment, the virtual camera and the virtual screen are fixed, and therefore, the transformation matrix may be stored in advance.

Next, in a step S43, the CPU core 34 transforms the gaze from the world coordinate system to the block coordinate system. Here, since a positional relationship between the block coordinate system and the world coordinate system is decided, that is, the origin of the block coordinate system is arranged at a predetermined position of the world coordinate system, the transformation matrix between the world coordinate system and the block coordinate system may be stored in advance. Furthermore, the three-dimensional puzzle 206 is rotated based on an amount of rotation, and thus, a reverse transformation depending on the amount of rotation is performed.

Succeedingly, in a step S45, the CPU core 34 considers the set of blocks 208, that is, the three-dimensional puzzle 206 as a set of grid-shaped planes on each of which the surface 220 is covered, and calculates an intersection point between the gaze and each plane. Each plane of the three-dimensional puzzle 206 is applied by integers of x, y, z, regarding the inclusive size of the three-dimensional puzzle 206 as a maximum value.

Then, in a step S47, the CPU core 34 determines whether or not a block 208 exists in the intersection point. As described above, a coordinate value of the block 208 of the block coordinate system is calculated from the coordinates of the intersection point, and an index number IB of the block 208 is calculated according to the equation 1. Then, with reference to the "whether to exist or not" flag of the block data corresponding to the index number IB, it is determined whether or not the flag is turned on. If "NO" in the step S4, the block 208 is not touched, and the block deleting processing is ended.

On the other hand, if "YES" in the step S47, that is, if a deleting instruction is performed on the block 208, the CPU core 34 specifies the closest block 208 as a touched block 208 in a step S49. The closest block 208 is a block 208 to which the surface 220 having the intersection point and the shortest distance from the camera belongs.

Then, in a step S51, the CPU core 34 determines whether or not the "whether to make a mistake or not" flag or the "whether to be marked or not" flag of the specified block 208 in the block data is turned on. The "whether to make a mistake or not" flag is turned on when a deleting instruction is performed on the block to be left 208, and therefore, if the "whether to make a mistake or not" flag is tuned on, the block 208 has already been determined to be the block to be left 208, and the block 208 has been displayed so as to indicate a mistake. Accordingly, the block 208 for which the "whether to make a mistake or not" flag is turned on is excluded from an object of the deletion determination. Furthermore, in a case that the user regards a block 208 as a block to be left 208 and marks it, or in a case that a deleting instruction is erroneously performed on the block to be left 208, the "whether to be marked or not" flag is turned on. That is, the block 208 for which the "whether to be marked or not" flag is turned on is a block 208 determined as not being deleted by the user, or a block to be left 208 defined according to the question. Accordingly, the block 208 for which the "whether to be marked or not" flag is turned on is also excluded from the object of a deletion determination. If "YES" in the step S51, since the block 208 as not being a deletion object which is displayed by a color for marking or displayed by an image of a mistake is touched, erasure processing with respect to the block 208 in a step S55 is inactivated, and the block deleting processing is ended.

On the other hand, if "NO" in the step S51, that is, if a deleting instruction is performed on the block 208 displayed with an original color, the CPU core 34 determines whether or not the "whether to leave or not" flag of the specified block 208 is turned on in the block data in a step S53.

If "NO" in the step S53, that is, if a deleting instruction is performed on an unnecessary block 208, the CPU core 34 turns off the "whether to exist or not" flag of the specified block 208 in the block data stored in the memory area 314 in a step S55. Thus, the block 208 on which the deleting instruction is performed is erased from the three-dimensional puzzle 206.

On the other hand, if "YES" in the step S53, that is, if a deleting instruction is performed on a necessary block 208, the CPU core 34 turns on the "whether to make a mistake or not" flag and the "whether to be marked or not" flag of the specified block 208 in the block data stored in the memory area 316 in a step S57. Thus, the block 208 on which a deleting instruction is erroneously performed is displayed with an image indicating a mistake as shown in FIG. 5. In this embodiment, since the block 208 on which a deleting instruction is erroneously performed is displayed with a color the same as the color when it is marked, the "whether to be marked or not" flag is also turned on. When the step S55 or S57 is ended, the block deleting processing is ended, and the processing returns to the step S23 in FIG. 17.

Figure 20:
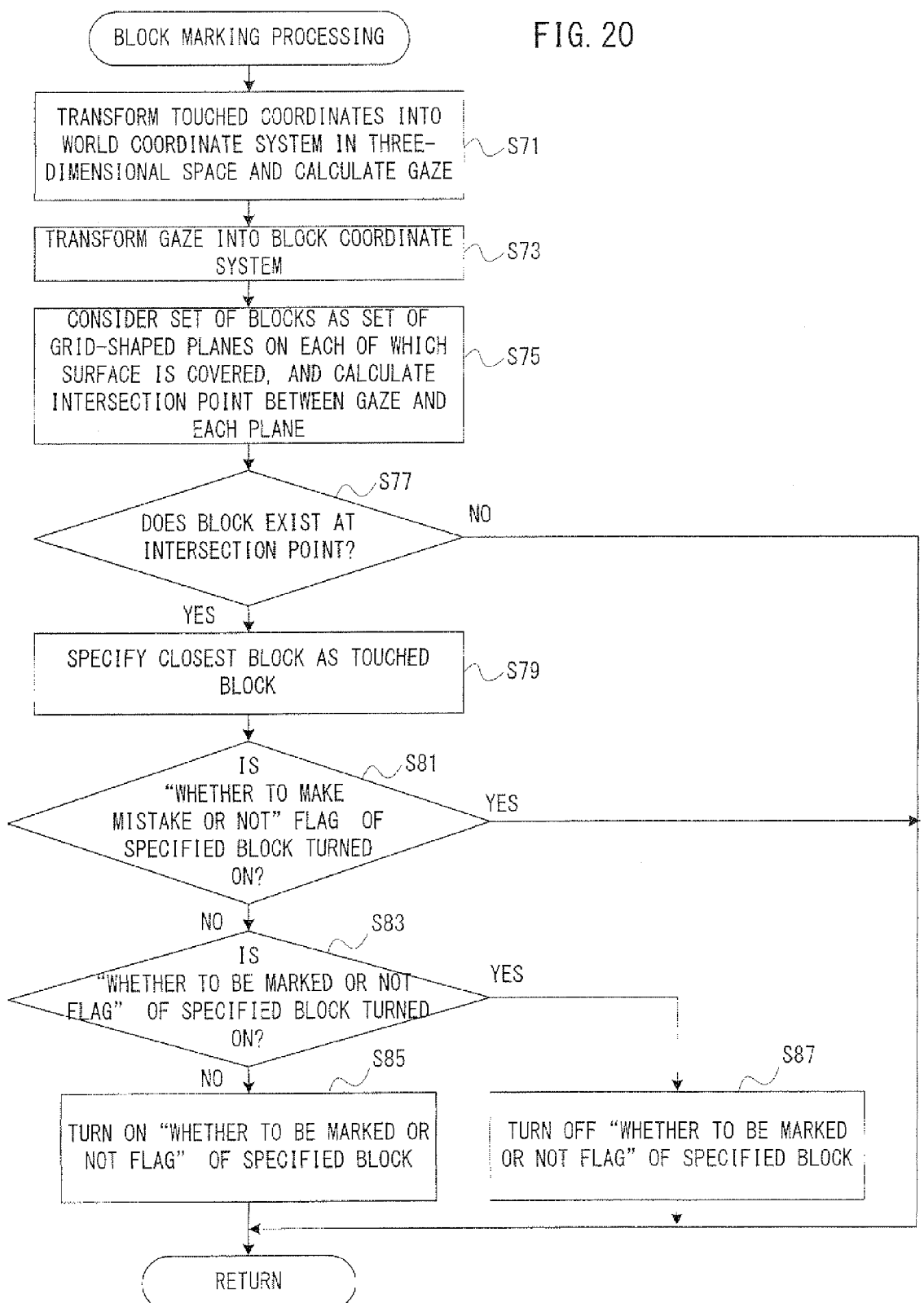
FIG. 20 is a flowchart showing one example of an operation of block marking processing in FIG. 17.

FIG. 20 shows one example of an operation of the block marking processing in the step S17 (FIG. 17). When starting the block marking processing, the CPU core 34 specifies a block 208 on which a marking instruction is performed in steps S71-S79. The processing in the steps S71-S79 is similar to the processing in the steps S41-S49 of the above-described block deleting processing, and therefore, the explanation is omitted here.

In a step S81, the CPU core 34 determines whether or not the "whether to make a mistake or not" flag of the specified block 208 is turned on in the block data. As described above, the block 208 for which the "whether to make a mistake or not" flag is turned on has already been determined to be the block to be left 208, and thus it is excluded from the object of a marking determination. Accordingly, if "YES" in the step S81, the block marking processing is ended.

On the other hand, if "NO" in the step S81, that is, if a marking instruction is performed on the block 208 for which whether to be left or not is not determined, the CPU core 34 determines whether or not the "whether to be marked or not" flag of the specified block 208 is turned on in the block data in a step S83.

If "NO" in the step S83, that is, if a marking instruction is performed on the block 208 displayed with an original color, the CPU core 34 turns on the "whether to be marked or not" flag of the specified block 208 in the block data stored in the memory area 316 in a step S85. Thus, the block 208 on which the marking instruction is performed is displayed with the color for marking.

On the other hand, if "YES" in the step S83, that is, if a marking instruction is performed again on the block 208 which has already been marked, the CPU core 34 turns off the "whether to be marked or not" flag of the specified block 208 in the block data stored in the memory area 316 in a step S87. Thus, the marking performed on the block 208 is canceled, and the block 208 is displayed with the original color again. After completion of the step S85 or S87, the block marking processing is ended, and the process returns to the step S23 in FIG. 17.

Figure 21:
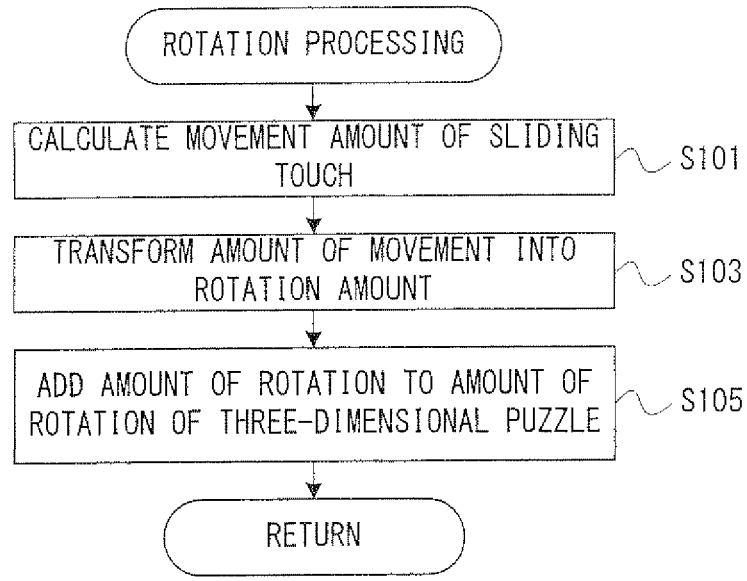
FIG. 21 is a flowchart showing one example of an operation of rotating processing in FIG. 17.

FIG. 21 shows one example of an operation of the rotating processing in the step S19 (FIG. 17). When starting the rotating processing, the CPU core 34 calculates an amount of movement of a sliding touch in a step S101. As described above, a difference between the previously touched coordinates and the currently touched coordinates is acquired for each of the X axis direction and Y axis direction of the touch panel 24, so that dragging values Dx and Dy are calculated and stored in the memory area 326.

Next, in a step S103, the CPU core 34 transforms the amount of movement into the amount of rotation. As described above, on the basis of a magnitude relation among the dragging values Dx, Dy and a threshold value T, roll values Rx, Ry are calculated by utilizing the equation 2 or the equation 3. If a quick sliding operation being equal to or more than the threshold value T is performed, larger roll values Rx, Ry are evaluated than when a slow sliding operation being smaller than the threshold value T is performed.

Then, in a step S105, the CPU core 34 adds the calculated amount of rotation to the amount of rotation of the three-dimensional puzzle 206, and updates the amount of rotation of the three-dimensional puzzle 206 in the memory area 328. As described above, the roll value Rx is added to the amount of rotation about the y axis of the block coordinate system of the three-dimensional puzzle 206, and the roll value Ry is added to the amount of rotation about the x axis of the block coordinate system of the three-dimensional puzzle 206. Thus, according to a sliding touch operation by the user, the three-dimensional puzzle 206 is rotated. After completion of step S105, the rotating processing is ended, and the process returns to the step S23 in FIG. 17.

Figure 22:
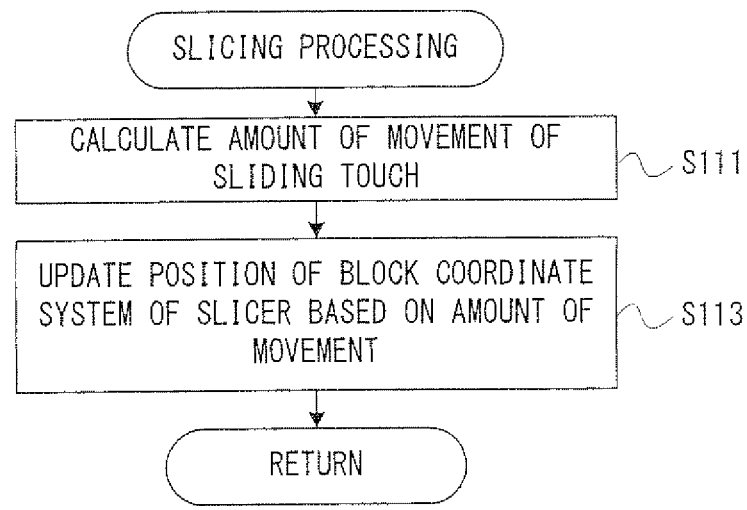
FIG. 22 is a flowchart showing a part of one example of an operation of slicing processing in FIG. 17.

FIG. 22 shows one example of an operation of the slicing processing in the step S21 (FIG. 17). The slicing processing is executed with respect to the slicer 218 which is determined to intersect with the gaze in the determination in the step S13 (FIG. 17).

When starting slicing processing, the CPU core 34 calculates an amount of movement of the sliding touch in a step S111. For example, the touched coordinates when a touch on the slicer 218 is started is stored as a reference point, and a vector from the reference point to a currently touched position is calculated on the basis of the coordinates of the reference point and the currently touched coordinates. Additionally, the amount of movement (vector) of the world coordinate system is calculated by the touched coordinates which is transformed from the touch panel coordinate system to the world coordinate system.

Then, in a step S113, the CPU core 34 updates the position of the slicer 218 of the block coordinate system on the basis of the amount of the movement. More specifically, the amount of the movement (vector) of the world coordinate system is transformed into the block coordinate system. If the touched slicer 218 is the slicer 218a, an x coordinate value of the block coordinate system of the slicer 218a is calculated on the basis of the amount of the movement and the position of the slicer 218a stored in the memory area 322, and the position data of the slicer 218a stored in the memory area 322 is updated. Furthermore, if the touched slicer 218 is the slicer 218b, a z coordinate value of the block coordinate system of the slicer 218b is calculated on the basis of the amount of the movement and the position of the slicer 218b stored in the memory area 322, and the position data of the slicer 218 stored in the memory area 322 is updated. When the step S113 is ended, the slicing processing is ended, and the process returns to the step S23 in FIG. 17.

Figure 23:
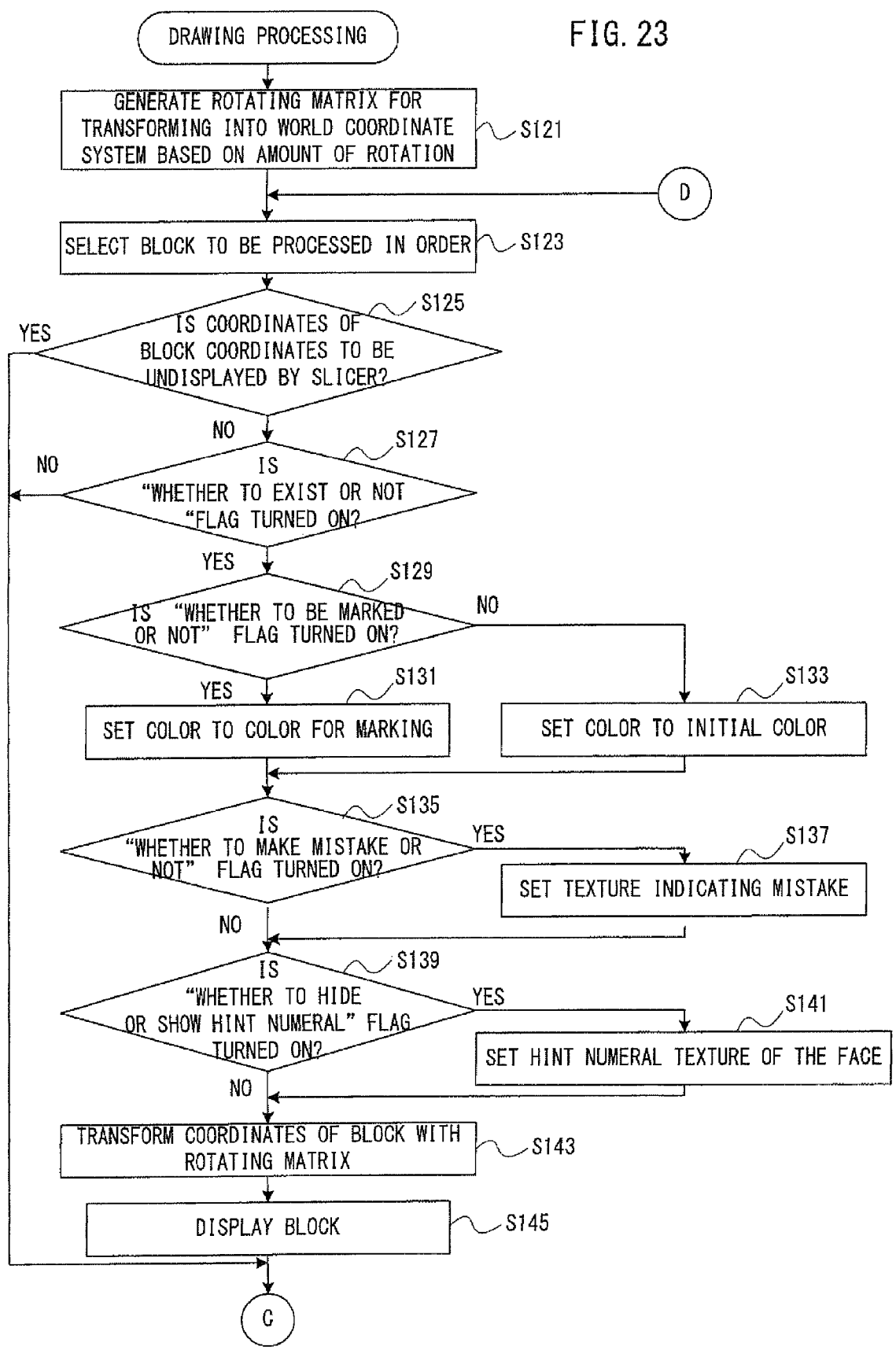
FIG. 23 is a flowchart showing a part of one example of an operation of drawing processing in FIG. 17.
Figure 24:
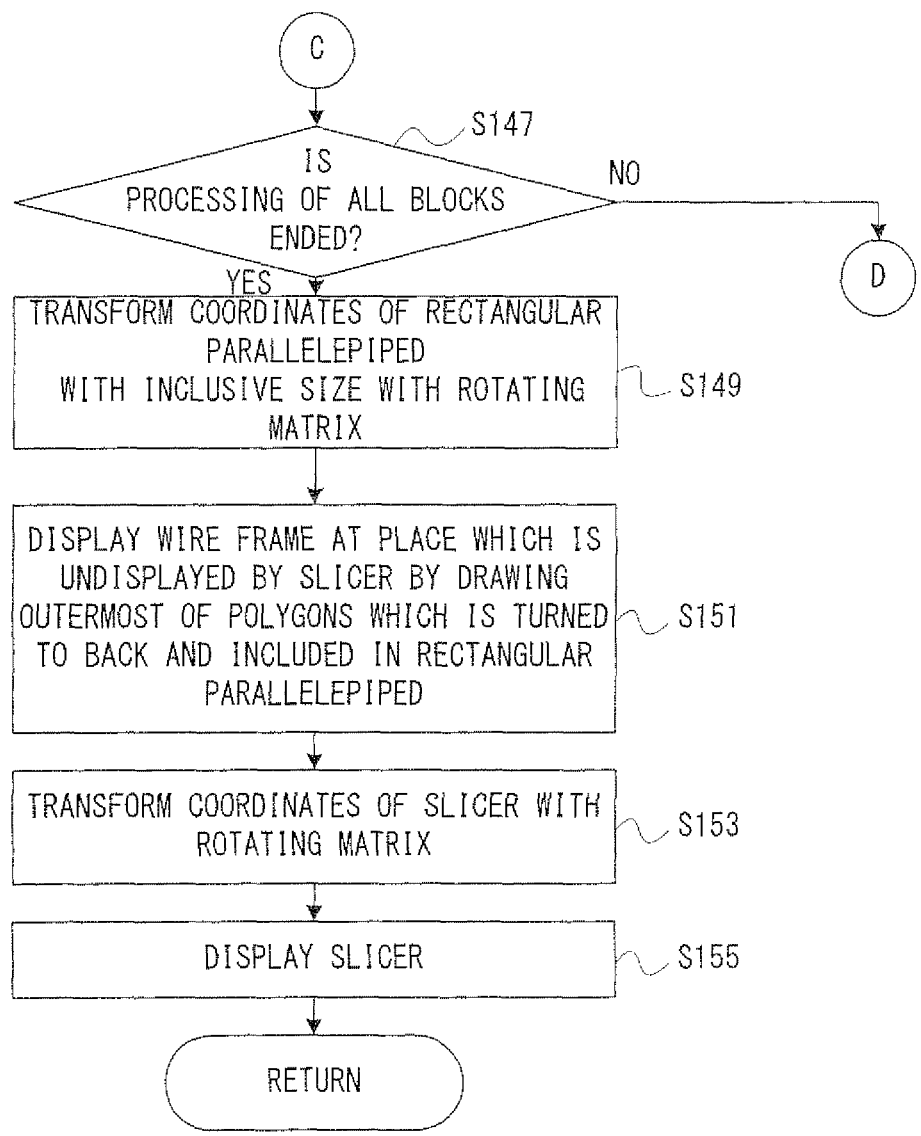
FIG. 24 is a flowchart showing a sequel from FIG. 23.

In the step S23 in FIG. 17, the CPU core 34 executes drawing processing. One example of an operation of the drawing processing is shown in FIG. 23 and FIG. 24.

When starting drawing processing, the CPU core 34 generates a rotating matrix for transforming from the block coordinate system to the world coordinate system on the basis of the amount of rotation stored in the memory area 328 in a step S121.

Succeedingly, in a step S123, the CPU core 34 selects in order a block 208 as an object to be processed. The block 208 as an object to be processed is selected one by one in an order of the z coordinate, x coordinate, and y coordinate, for example. As described above, the block data is an array, and by selecting the index number of the array in the above described order, it is possible to select the block 208.

In a step S125, the CPU core 34 determines whether or not the coordinates of the block 208 are coordinates which are to be undisplayed by the slicer 218. As described above, the block 208 is brought into correspondence with the coordinate value of the block coordinate system, and the position of the slicer 218 of the block coordinate system is stored in the memory area 322, and therefore, it is easily determined whether or not the block 208 is to be undisplayed by comparing the coordinate values in the block coordinate system. More specifically, it is determined whether or not the x coordinate value of the block 208 is equal to or more than the x coordinate value of the slicer 218a for indicating a position in the x axis direction. Furthermore, it is determined whether or not the z coordinate value of the block 208 is equal to or more than a z coordinate value of the slicer 218b for indicating a position in the z axis direction. If "YES" in the step S125, that is, if the block 208 as an object to be processed is the undisplayed block 208, the process proceeds to a step S147 in FIG. 24 without displaying the block 208.

On the other hand, if "NO" in the step S125, that is, if the block 208 as an object to be processed is not the block 208 to be undisplayed, the CPU core 34 determines whether or not the "whether to exist or not" flag of the block 208 is turned on with reference to the block data in a step S127. If "NO" in the step S127, that is, if there is no block 208, the process proceeds to a step S147 in FIG. 24.

On the other hand, if "YES" in the step S127, that is, if a block 208 exist, the CPU core 34 determines whether or not the "whether to be marked or not" flag is turned on in a step S129. If "YES" in the step S129, the CPU core 34 sets the color of the block 208 to a color for marking in a step S131.

Here, setting data of a color in displaying the block 208 is stored in a predetermined area of the data memory area 302. Thus, the block 208 is displayed with an original predetermined color for marking.

On the other hand, if "NO" in the step S129, the CPU core 34 sets the color of the block 208 to the original color in a step S133. Thus, the block 208 is displayed with the original predetermined color.

When the processing in the step S131 or S133 is ended, the CPU core 34 determines whether or not the "whether to make a mistake or not" flag of the block 208 is turned on with reference to the block data in a step S135. If "YES" in the step S135, the CPU core 34 sets a texture indicating a mistake as a texture of the block 208 in a step S137. Here, the setting data of the texture when the block 208 is displayed is stored in the data memory area 302. Thus, the block 208 is displayed by an image of a mistake of representing a block 208 whose surface is cracked (see FIG. 5), for example.

If the step S137 is ended, or if "NO" in the step S135, the CPU core 34 determines whether or not the "whether to show or hide a hint numeral" flag is turned on for each surface of the block 208 with reference to the block data in a step S139. If "YES" in the step S139, that is, if a hint numeral 210 is displayed on any one of the surfaces, the CPU core 34 sets the hint numeral texture of the surface on the basis of the information of the kind of the hint numeral texture stored in the memory area 316 in a step S141. Thus, the hint numeral 210 is displayed on the relevant surface out of the surfaces of the block 208.

If the step S141 is ended, or if "NO" in the step S139, the CPU core 34 transforms the coordinates of the block 208 with the rotating matrix in a step S143. That is, the coordinates of the block 208 which is transformed from the block coordinate system to the world coordinate system are calculated. Here, in this transformation, the transformation matrix for transforming the block coordinate system into the world coordinate system is also used as well as the rotating matrix based on the amount of rotation. The coordinate data of the calculated block 208 in the world coordinate system is stored in a predetermined area of the data memory area 312.

Then, in a step S145, the CPU core 34 displays the block 208 by utilizing the CPU 46. More specifically, the block 208 is drawn in the buffer of the VRAM 54 on the basis of the data set in the step S131, S133, S137 or S141 and the coordinate data calculated in the step S143 by the GPU 46. Accordingly, if the block 208 is placed at the forefront when seen from the camera, the block 208 is displayed on the LCD 14 by the LCD controller 50 at a predetermined display timing.

Succeedingly, in a step S147 in FIG. 24, the CPU core 34 determines whether or not processing as to all the blocks 208 is ended. If "NO" in the step S147, the process returns to the step S123 in FIG. 23 to select a next block 208 as an object to be processed, and performs processing for displaying the block 208 (steps S125-S145). The aforementioned processing is repeated until "YES" is determined in the step S147.

Then, if "YES" is determined in the step S147, that is, if the processing as to all the blocks 208 is ended, the CPU core 34 transforms the coordinates of the rectangular parallelepiped with the inclusive size by the rotating matrix in a step S149. That is, in order to draw the wireframe 222 at a part which is undisplayed by the slicer 218, the rectangular parallelepiped with the inclusive size is generated in the block coordinate system, and the coordinates are transformed into the world coordinate system. Here, in this transformation, the transformation matrix for transforming the block coordinate system into the world coordinate system is also used as well as the rotating matrix based on the amount of rotation.

In a step S151, the CPU core 34 displays the wireframe 222 at a place which is undisplayed by the slicer 218, by drawing the outermost of the polygons which is turned to the back and included in the rectangular parallelepiped by utilizing the GPU 46. More specifically, the wireframe 222 is drawn in the buffer of the VRAM 54 by utilizing the GPU 46. Accordingly, the wireframe 222 is displayed on the LCD 14 by means of the LCD controller 50 at a predetermined display timing (see FIG. 11).

Furthermore, in a step S153, the CPU core 34 transforms the coordinates of the slicer 218 by the rotating matrix. That is, the coordinates of the slicer 218 are transformed from the block coordinate system to the world coordinate system. Here, in this transformation also, the transformation matrix for transforming the block coordinate system into the world coordinate system is used as well as the rotating matrix based on the amount of rotation.

Then, in a step S155, the CPU core 34 displays the slicer 218 by utilizing the GPU 46. More specifically, the slicer 218 is drawn in the buffer of the VRAM 54 by the CPU 46. Accordingly, if the slicer 218 is arranged at the forefront when viewed from the camera, the slicer 218 is displayed on the LCD 14 by utilizing the LCD controller 50 at a predetermined timing. When the step S155 is ended, this drawing processing is ended, and the process proceeds to a step S25 in FIG. 18.

In the step S25 in FIG. 18, the CPU core 34 determines whether or not the "whether to leave or not" flags of all the existing blocks 208 are turned on with reference to the block data. That is, it is determined whether or not the game clear condition is satisfied. Here, the existing blocks 208 are blocks 208 for which the "whether to exist or not" flags are turned on.

If "YES" in the step S25, that is, if the three-dimensional puzzle 206 is determined to be solved, the CPU core 34 executes game clear processing in a step S27. In the game clear processing, in a case that the 3D model data of the completed three-dimensional model 224 is stored, the remaining blocks are drawn by being replaced with the 3D model data of the completed three-dimensional model 224, and the completed three-dimensional model 224 is displayed on the LCD 14 (see FIG. 13). Furthermore, an evaluation of the user may be performed. For example, the score of the user and the rank according to the evaluation at a plurality of levels may be calculated and displayed on the basis of a difficulty level of the three-dimensional puzzle 206, a time required for answering, the number of mistakes, etc.

On the other hand, if "NO" in the step S25, the CPU core 34 determines whether or not the time limit runs out, or whether or not the number of mistakes reaches a predetermined value in a step S29. That is, whether or not the game over condition is satisfied is determined. Additionally, the elapsed time from the start of the game is counted by the processing in the step S3. Furthermore, the number of mistakes can be calculated by counting the number of blocks 208 for which the "whether to make a mistake or not" flag is turned on with reference to the block data.

If "NO" in the step S29, that is, if the game over condition is not satisfied, the process returns to the step S3 in FIG. 17. Accordingly, the processes in the steps S3-S23 are repeated until the game clear condition is satisfied in the step S25, or until the game over condition is satisfied in the step S29.

On the other hand, if "YES" in the step S29, the CPU core 34 executes the game over processing in the step S31. In the game over processing, for example, the text of "game over" is displayed on the screen. In addition, similar to the game clear processing, an evaluation of the user may be performed, and the score and the rank, etc. are calculated and displayed on the basis of the difficulty level, etc. of the three-dimensional puzzle 206. When the step S27 or S31 is ended, the game processing is ended.

According to this embodiment, the three-dimensional puzzle 206 formed by arranging the plurality of blocks 208 in the three-dimensional directions in the virtual three-dimensional space, and the hint information for searching the block to be left 208 in each block row of the three-dimensional puzzle 206 are displayed, and the user can solve the puzzle by deleting unnecessary blocks therefrom. Accordingly, the user can solve the three-dimensional puzzle by utilizing the hint information as a clue as if the user curves out the three-dimensional puzzle, and thereby can complete a predetermined three-dimensional model. Thus, it is possible to provide a novel and interesting three-dimensional puzzle game capable of solving the game by deleting only the unnecessary blocks 206 from the three-dimensional puzzle 206 being composed of the plurality of blocks 208.

Additionally, in the above-described embodiment, the hint numerals 210 are displayed on the surface of the block 208, but in another embodiment, they may be displayed outside the block 208 like the slicer 218.

In addition, in each of the above-described embodiments, the hint numeral 210 is always displayed, but in another embodiment, it may be displayed at a time when a predetermined operation by the user is made, or at regular time intervals, and this makes it possible to enhance the difficulty level of the puzzle.

Furthermore, in each of the above-described embodiments, all the hint numerals 210 in each block row are displayed at a time, but in another embodiment, the hint numerals 210 may be switched and displayed for each block row. For example, in a case that the block 208 takes a shape not having a face corresponding to each block row, the hint numeral 210 in each block row can be displayed on the block 208 through switching.

Moreover, in each of the above-described embodiments, on the basis of the "whether to leave or not" flag of the block 208 stored in advance in the ROM 28a, the hint numeral 210 on each surface of each block 208 is calculated, and the block data relative to the kind of the hint numeral texture is generated. However, in another embodiment, data indicating the hint numeral 210 of each surface of each block 208 is stored in advance as static question data. From the data indicating the hint numeral 210, the "whether to leave or not" flag of the block 208 is calculated, and the block data relative to the "whether to leave or not" flag may be dynamically generated.

Furthermore, in each of the above-described embodiments, as hint information as a hint for searching a block to be left 208, the hint numeral 210 indicating the number of blocks to be left 208 in a block row is displayed, but the hint information is only necessary to be information capable of specifying a block to be left 208 from a block row, and thus, in another embodiment, another information may be displayed.

In addition, in each of the above-described embodiments, the three-dimensional puzzle 206 is formed by arranging the plurality of blocks 208 in a rectangular parallelepiped or a cube. However, the three-dimensional puzzle 206 as a question is only necessary to be formed by arranging a plurality of blocks 208 in a three-dimensional manner, that is, three-dimensional directions, and the original shape of the three-dimensional puzzle 206 may be changed as necessary. For example, the original shape of the three-dimensional puzzle 206 may be a geometrical shape, such as a sphere, a quadrangular prism, etc., or may take a shape of an object such as fruits, animal, characters, etc.

Furthermore, in each of the above-described embodiments, the block 208 is a cubic shape, but in another embodiment, the block 208 takes another shape, such as a sphere.

Additionally, in each of the above-described embodiments, a block 208 to be undisplayed is designated by designating an arbitrary position of the cubic block 206 in each axis direction of the block coordinate system by utilizing the slicer 218, but a method of designating the block 208 to be undisplayed may be changed as necessary. For example, the touched block 208 may be undisplayed.

In addition, in each of the above-described embodiments, as a pointing device for designating an arbitrary position on the screen, the touch panel 24 is used, but in another embodiment, it is possible to use other pointing devices, such as a pen tablet, a touch pad, a computer mouse, and etc. Here, it is preferable to display a designation image like a mouse pointer for clearly showing the designated position to the user. Moreover, in a case of devices which make the coordinates constantly turn on, such as a mouse, the presence or absence of an input may be identified according to switching on and off the button, etc.

Additionally, in another embodiment, designating the block 208 or the slicer 218 may be performed by the operating switch 22 like the direction instructing switch 22a, etc. For example, the position of the pointer (designation image) is moved over the block 208 or the slicer 218 with the direction instructing switch 22a, and with an operation of the action switch 22d, the block 208 or the slicer 218 may be designated. Or, a cursor displayed over the block 208 or slicer the 218 is moved with the direction instructing switch 22a, and with an operation of the action switch 22d, the block 208 or the slicer 218 may be designated. Here, the deleting instruction and the marking instruction may be identified by changing the action switch 22 to be used, changing the kind of the pointer or the cursor, and so forth.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A three-dimensional puzzle game apparatus executing a game for solving a three-dimensional puzzle in a virtual three-dimensional space, comprising:

a processing system including one or more processors, the processing system configured to at least:

display a three-dimensional puzzle including a plurality of blocks arranged in each of three-dimensional directions of said virtual three-dimensional space and information as a hint for searching a block to be left from an arbitrary block row;

determine whether or not a deleting instruction is performed on any one of the blocks on the basis of input information from a pointing device, the pointing device being configured to designate a position based on a two-dimensional coordinate placed on a screen in which the three-dimensional puzzle is displayed;

calculate a gaze from the position designated by said pointing device;

specify a designated block to which said deleting instruction is performed by calculating an intersection point between said gaze and a surface of each block;

determine whether or not the designated block to which said deleting instruction is performed is a block to be left when said deleting instruction is performed on said block;

erase the designated block on which said deleting instruction is performed when the designated block to which said deleting instruction is performed is not a block to be left; and determine whether or not said three-dimensional puzzle is solved by determining whether or not all the remaining blocks are said block to be left by forming a three-dimensional model indicative of a solution.

2. The three-dimensional puzzle game apparatus according to claim 1, wherein said processing system is further configured to:

store in advance deletion information indicating whether a deletion is correct or incorrect by bringing it into correspondence with each of said plurality of blocks, and perform a determination based on said deletion information corresponding to the block to which said deleting instruction is performed.

3. The three-dimensional puzzle game apparatus according to claim 2, wherein said hint information is generated from said deletion information of the respective blocks making up of said block row.

4. The three-dimensional puzzle game apparatus according to claim 1, wherein said hint information is displayed on a surface vertical to a direction of the row of the respective blocks making up of said block row.

5. The three-dimensional puzzle game apparatus according to claim 1, wherein said processing system is further configured to:

determine whether or not a marking instruction is performed on any one of the blocks on the basis of said input information, when said marking instruction is performed on said block, store information indicating that said block is marked by bringing it into correspondence with the block to which said marking instruction is performed, and when said deleting instruction is performed, determine whether or not a block to which said deleting instruction is performed is a marked block, and inactivate the erasure processing on said marked block.

6. The three-dimensional puzzle game apparatus according to claim 1, wherein said processing system is further configured to:

further determine whether or not a non-displaying instruction is performed on an arbitrary block on the basis of said input information, and not display said block on which said non-displaying instruction is performed when said non-displaying instruction is determined to be performed on said block.

7. The three-dimensional puzzle game apparatus according to claim 1, wherein said processing system is further configured to:

calculate an amount of rotation of said three-dimensional puzzle on the basis of an amount of change of said designated position by said pointing device, and display said three-dimensional puzzle rotated on the basis of the amount of rotation.

8. The three-dimensional puzzle game apparatus according to claim 1, wherein the three-dimensional model forms a three-dimensional image of a virtual object representing the solution to the three-dimensional puzzle.

9. The three-dimensional puzzle game apparatus according to claim 1, wherein the three-dimensional puzzle is solved when a specific three-dimensional model is formed from said blocks to be left.

10. A non-transitory program product for a three-dimensional puzzle game apparatus executing a game for solving a three-dimensional puzzle in a virtual three-dimensional space, the program product causes a computer of said three-dimensional puzzle game apparatus to perform functionality comprising:

displaying a three-dimensional puzzle including a plurality of blocks arranged in each of three-dimensional directions of said virtual three-dimensional space and information as a hint for searching a block to be left from an arbitrary block row;

determining whether or not a deleting instruction is performed on any one of the blocks on the basis of input information from a pointing device, the pointing device being configured to designate a position based on a two-dimensional coordinate placed on a screen in which the three-dimensional puzzle is displayed;

calculating a gaze from the position designated by said pointing device;

specifying a designated block to which said deleting instruction is performed by calculating an intersection point between said gaze and a surface of each block;

determining, when said deleting instruction is performed on said block, whether or not the designated block to which said deleting instruction is performed is a block to be left;

erasing, when it is determined that the designated block to which said deleting instruction is performed is not a block to be left, the designated block on which said deleting instruction is performed; and determining whether or not said three-dimensional puzzle is solved by determining whether or not all the remaining blocks are said block to be left by forming a three-dimensional model indicative of a solution.

11. The program product according to claim 10, wherein the three-dimensional model forms a three-dimensional image of a virtual object representing the solution to the three-dimensional puzzle.

12. The program product according to claim 10, wherein the three-dimensional puzzle is solved when a specific three-dimensional model is formed from said blocks to be left.

13. A game controlling method of a three-dimensional puzzle game apparatus executing a game for solving a three-dimensional puzzle in a virtual three-dimensional space, comprising:

displaying a three-dimensional puzzle including a plurality of blocks arranged in each of three-dimensional directions of said virtual three-dimensional space and information as a hint for searching a block to be left from an arbitrary block row;

determining whether or not a deleting instruction is performed on any one of the blocks on the basis of input information from a pointing device, the pointing device being configured to designate a position based on a two-dimensional coordinate placed on a screen in which the three-dimensional puzzle is displayed;

calculating a gaze from the position designated by said pointing device;

specifying a designated block to which said deleting instruction is performed by calculating an intersection point between said gaze and a surface of each block;

determining whether or not the designated block to which said deleting instruction is performed is a block to be left when said deleting instruction is performed on said block;

erasing the designated block on which said deleting instruction is performed when the designated block to which said deleting instruction is performed is not a block to be left; and determining whether or not said three-dimensional puzzle is solved by determining whether or not all the remaining blocks are said block to be left by forming a three-dimensional model indicative of a solution.

14. The game controlling method according to claim 13, wherein the three-dimensional model forms a three-dimensional image of a virtual object representing the solution to the three-dimensional puzzle.

15. The game controlling method according to claim 13, wherein the three-dimensional puzzle is solved when a specific three-dimensional model is formed from said blocks to be left.

16. A three-dimensional puzzle game system executing a game for solving a three-dimensional puzzle in a virtual three-dimensional space, comprising:
   a pointing device; and
   a processing system including one or more processors, the processing system configured to at least:
      display a three-dimensional puzzle including a plurality of blocks arranged in each of three-dimensional directions of said virtual three-dimensional space and information as a hint for searching a block to be left from an arbitrary block row,
      determine whether or not a deleting instruction is performed on any one of the blocks on the basis of input information from the pointing device, the pointing device being configured to designate a position based on a two-dimensional coordinate placed on a screen in which the three-dimensional puzzle is displayed,
      calculate a gaze from the position designated by said pointing device,
      specify a designated block to which said deleting instruction is performed by calculating an intersection point between said gaze and a surface of each block,
      determine whether or not the designated block to which said deleting instruction is performed is a block to be left when said deleting instruction is performed on said block,
      erase the designated block on which said deleting instruction is performed when the designated block to which said deleting instruction is performed is not a block to be left, and
      determine whether or not said three-dimensional puzzle is solved by determining whether or not all the remaining blocks are said block to be left by forming a three-dimensional model indicative of a solution.

17. The three-dimensional puzzle game system according to claim 16, wherein the three-dimensional model forms a three-dimensional image of a virtual object representing the solution to the three-dimensional puzzle.

18. The three-dimensional puzzle game system according to claim 16, wherein the three-dimensional puzzle is solved when a specific three-dimensional model is formed from said blocks to be left.

* * * * *